United States Patent [19]

Pose et al.

[11] Patent Number: 5,841,439
[45] Date of Patent: Nov. 24, 1998

[54] UPDATING GRAPHICAL OBJECTS BASED ON OBJECT VALIDITY PERIODS

[75] Inventors: Ronald David Pose, Caulfield North; Matthew James Regan, Glen Waverley, both of Australia

[73] Assignee: Monash University, Clayton, Australia

[21] Appl. No.: 847,567

[22] Filed: Apr. 24, 1997

Related U.S. Application Data

[62] Division of Ser. No. 307,330, Sep. 16, 1994, abandoned.

[30] Foreign Application Priority Data

Jul. 22, 1994 [AU] Australia ..................... PM 701 3/98

[51] Int. Cl.$^6$ .................................................. G06T 15/00
[52] U.S. Cl. .......................... 345/418; 345/421; 345/422; 345/501
[58] Field of Search ......................... 345/418–9, 421–22, 345/433, 436, 441, 112–114, 520, 189–91, 201

[56] References Cited

U.S. PATENT DOCUMENTS

| 4,477,802 | 10/1984 | Walter et al. | 340/727 |
| 5,426,733 | 6/1995 | Masuri | 395/166 |
| 5,592,601 | 1/1997 | Keley et al. | 395/143 |
| 5,608,850 | 3/1997 | Robertson | 395/127 |

OTHER PUBLICATIONS

Riechlen, Bruce, "Sparcchait: A One Hundred Million Pixel Display", *Virtual Reality, 1993 international Symposium*, pp. 300–307, 1993.

Paper entitled "An Architecture for Orientation Mapping Post Rendering" from the proceedings of the third International Conference on Artifical Reality and Tele–Existence, ICAT '93, Jul. 6–7, 1993, pp. 121, et seq. Authors: Matthew Regan and Ronald Pose.

Paper entitled "A Low Latency Virtual Reality Display System" Technical Report No: 92/166, Sep. 1992, pp. 1–12, Authors: Matthew Regan and Ronald Pose. Department of Computer Science, Monash Univesity, Wellington Rd, Clayton, Victoria 3168.

Paper entitled "An Interactive Graphics Display Architecture" from the proceedings of VRAIS–93: Virtual Reality Annual International Symposium, Sep. 18–22, 1993, pp. 293–299, Authors: Matthew Regan and Ronald Pose.

*Primary Examiner*—Phu K. Nguyen
*Assistant Examiner*—Rudolph Buchel
*Attorney, Agent, or Firm*—Fliesler, Dubb, Meyer & Lovejoy, LLP

[57] ABSTRACT

A graphic display system includes a set of rendering engines and a plurality of data storage units. Each data storage unit in the set of data storage units is coupled to at least one rendering engine in the set of rendering engines. A selection means is included in the graphic display system for selecting a data storage unit in the plurality of data storage units. The selected data storage unit is to be used for storing data representing an object to be displayed by the graphic display system and is selected based on a validity period of the object. The selection means includes means for determining a size validity period of the object and means for determining a translational validity period of the object. The translational validity period is a time required for the object to change by a predetermined translational threshold, wherein the predetermined translational threshold is a first angle extending from a line that passes through both a reference point and the object. The size validity period is a time required for the object to change by a predetermined size threshold, wherein the predetermined size threshold is a second angle extending from the line.

26 Claims, 18 Drawing Sheets

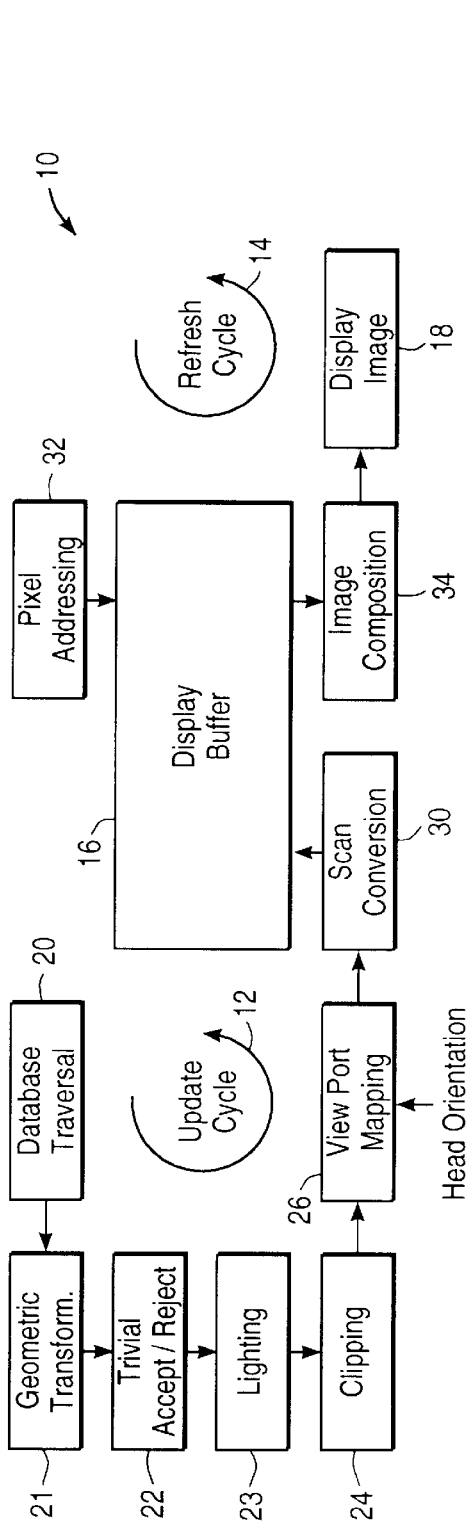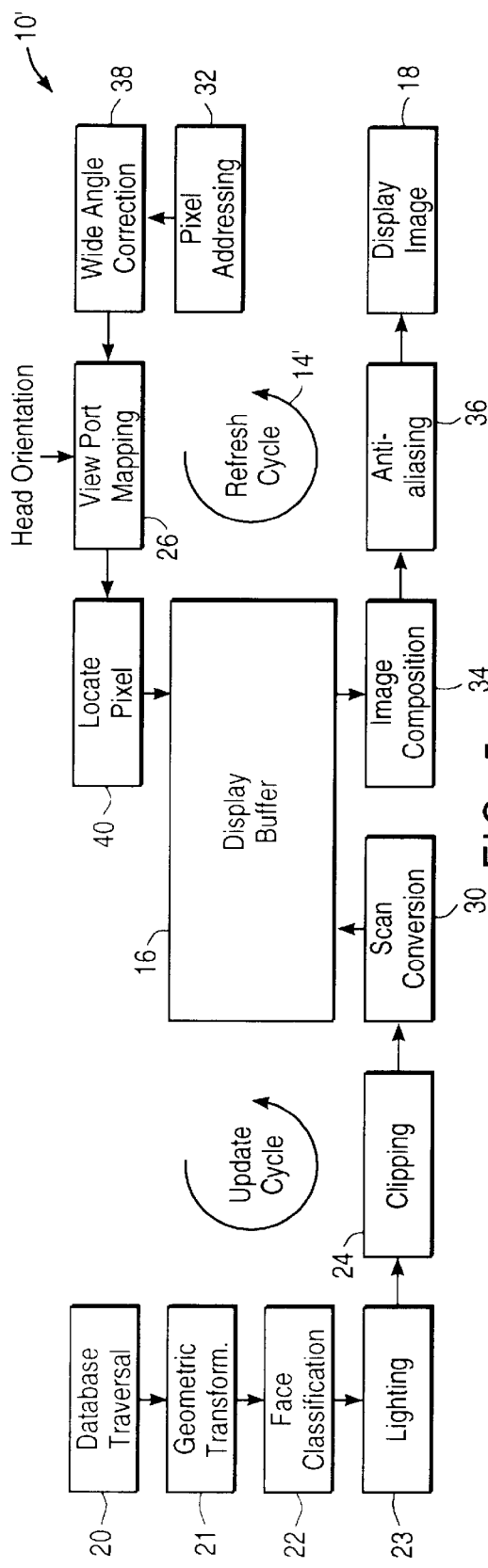

$$\tau_{translation}(i) = \frac{distance(i) * sqrt(2*(1 - cos(\theta_t)))}{relative\_speed(i)}$$

Where i = object number $$\tau_{size}(i) = \frac{distance(i) - radius(i) / sin(\theta_t + Asin(radius(i) / distance(i)))}{relative\_speed(i)}$$

Where i = object number

UPDATING GRAPHICAL OBJECTS BASED ON OBJECT VALIDITY PERIODS

This is a division of application Ser. No. 08/307,330, filed on Sep. 16, 1994, now abandoned.

This invention relates to a graphical display system, such as for displaying signals from a computer apparatus, which can find application in the field of virtual reality systems.

INTRODUCTION

In recent times virtual reality has become a growing area within the field of computer graphics, with many and varied applications such as flight and other training simulations, scientific visualisation as well as the expanding entertainment field. Many systems suffer from inadequate performance resulting in a lack of realism and even psychological side effects.

Current research is directed toward developing an integrated visualisation system which creates virtual worlds and represents them through computer graphics. In order to render real world environments as faithfully as possible, enormous processing power is required. Current systems tend to be characterised by lengthy, noticeable delays between user gestures and system responses. Such interactive latency may result in serious physiological side-effects such as the induction of motion sickness.

For example, researchers and practitioners have long been grappling with the serious problem of latency in responding to movement of a user in a virtual environment. This problem is most difficult to handle in the visual domain since the sheer quantity of data and processing required to update the view delivered to the user is beyond the capabilities of even high-end computer graphics system. The problem, while simply described as the lag between a user's head position or orientation changing and the updating of the displayed virtual view to reflect that change, has rather severe consequences, and has eluded solution by many practitioners. A particularly disturbing effect is that of motion sickness which occurs when the brain's expectation of orientation and position is not matched by appropriate sensory input, in this case visual input. To put it simply the view displayed is not what the brain expects so disorientation and perhaps motion sickness can occur.

The three major components of a virtual reality display system are a head mounted display providing images to the user, a transducer to measure the position and orientation of the users' head and finally an image generator. The head mounted display provides a window to the virtual 3D world. The position and orientation of this window is directly related to the position and orientation of the user's head. Thus when the user head moves, the view of the 3D world as seen through the head mounted display changes appropriately. Other display techniques have also been tried. An interesting example is the immersion technique demonstrated at SIGGRAPH 1992 where the walls, floor and ceiling of a chamber were display screens which surrounded the user completely.

Head mounted displays present a computer generated view of a virtual world to a human user. Such displays generally contain two small physical display devices, recently colour Liquid Crystal Display screens have become the dominant choice. Each display device is presented independently to one eye, allowing three dimensional binocular images to be presented to the user.

The other major component within the display device is a set of wide angle viewing lenses. These lenses warp the image so as to present an image covering most of the users field of view. This type of lens is of particular interest within this display system because while covering a large field of view is desirable, the more the lenses warp the image, the more computationally expensive the images are to create. This is because the distortions caused by the lenses have to be compensated with expensive computations during image creation.

A head mounted tracking system is a fundamental component of a virtual reality system. Experimental and commercial head tracking units employ tracking techniques based upon magnetism, mechanics and optics. While all three techniques are valid, there exists a large difference in the application, expense and performance between the techniques.

Magnetic devices such as the Polhemus 3Space Isotrack, tend to be the most prevalent with current systems. The devices consist of a magnetic source and a small detection unit mounted on the users head containing three mutually perpendicular coils. When a user gesture is made, the relative position and orientation of the detector changes, resulting in orientation information which is digitised and sent to the display system. Although such systems have a limited operating spaces, more recent magnetic trackers operate with as little as 4 milliseconds latency.

The purpose of an image generator within an interactive graphics system is to maintain the illusion of immersion within a virtual world. This is achieved by completely redrawing the virtual scene based upon the position and orientation of the user's head whenever the user's position or orientation changes. The scene must also be redrawn whenever any animation within the scene is to occur. The rate at which the scene is redrawn is referred to as the frame rate. For the illusion of immersion within a virtual world to be maintained frame rates in the order of ten to sixty plus frames per second are required. Increasing the frame rate within an interactive display system is a desirable characteristic.

Completely redrawing a scene is a computationally expensive operation. Realistically convincing scenes require many polygons to be drawn for each frame. While cartoon-like environments may be produced with as few as five hundred polygons, scenes with tens of thousands of polygons are still far from totally realistic.

The total number of polygons per second required for each of the users eyes within a virtual reality system is the product of the number of polygons required per frame and the total number of frames per second to be displayed. For a fixed polygon rendering rate, the polygons per frame are in direct opposition to the display frame rate, hence a trade-off between the two is often required. As the polygon rendering rate directly effects the scene realism and scene fluidity, many researchers attempt to improve the performance of their systems by focussing mainly upon the polygon rendering engine. Special purpose graphics architectures designed specifically for high levels of user interaction have therefore been contemplated based upon extremely powerful polygon rendering engines.

One approach to building virtual reality systems has been to slow the update rate of the display so as to enable the computer system to cope with the processing load. This leads to a rather jerky displayed world with latency being at least the time between updates of the display. Experience with motion pictures and with television has shown that the higher the frame rate the better.

An alternative approach is to reduce the processing load by reducing the quality and resolution of the images displayed. While the display update rate is increased and latency somewhat reduced with this approach, a degree of realism in the virtual world must be sacrificed, leaving one with cartoon-like imagery rather than anything approaching photo realism.

The state-of-the-art in conventional virtual reality systems rely on using the fastest available graphics processing and rendering equipment. This tends to be very expensive with the very best systems costing over a million dollars. In effect the problem is tackled indirectly through the use of massive amounts of processing power. Even so it can be observed that the trade-off between latency and image quality still has to be made, and that with reasonably realistic looking scenes the latency is still a significant problem. An extremely successful virtual reality computing system is the Pixel-Planes system developed at the University of North Carolina. This uses thousands of processors to give extremely impressive rendering performance and very good latency characteristics, however PixelPlanes is rather expensive technology which most developers could not afford.

In order to deal with this problem of latency and to understand the development of the present invention, it is helpful to forget for a moment the conventional ways of computer graphics and instead investigate the overall virtual environment.

The problem as stated earlier is one of mismatch between what is displayed to the user and what should be displayed according to the virtual world model in which the user is situated. This mismatch usually is due to the latency involved in updating the display to reflect the virtual reality. The easy solution, involving reducing image quality so one can keep up with the virtual world, creates a mismatch of a different kind but still spoils the illusion of virtual reality.

It is helpful to examine the extent to which activity occurs in the virtual world itself, such as some part of the virtual environment changing or moving in some way. While indeed this does occur, it has been found that in general only a small part of the virtual world changes at any time, and typically the virtual world contains many static objects or scenes. Thus it is possible to deal with such activity without recomputing everything, and since the objects involved are generally independent of the user a slight delay in reflecting their changes does not cause the serious problems mentioned above.

The other activity which occurs in the virtual world is more significant, and involves the movement of the user within the virtual environment. Any slight movement of the user's head leads to a change in everything the user sees and thus appears to the user as though the observed environment has moved completely. It can therefore be appreciated that it is relative movement between the user and the objects in the virtual world which is observable to the user, and it is the user's own movement which has the most dramatic effect since it affects the display of even static parts of the virtual world. The various types of user movement in the virtual world and their consequences are discussed below.

Consider firstly a displacing movement (translation) such as the action of walking forward. When translating, objects in the world appear to move relative to the subject. Close objects appear to move more than distant ones. Very distant objects may not appear to move much at all. Thus for translations in a virtual environment the rendering of objects designated as being close to the user will require greater processing than the distant background in which changes can largely be ignored. In typical scenes the majority of the complexity of the scene is in the background.

Another movement relates to changes in the rotational aspect of the user's head. Even a small rotational change immediately causes everything in the observed view to appear to move, even the background and static objects. There is also the added problem that rotations generally occur faster and more frequently than translations. In other words, a person tends to look around and observe the environment by rotating head and eyes at a faster rate and to a greater extent than moving through the environment.

From the above discussion, it would appear that the environment remains relatively static while the user's view of the environment changes quite rapidly and somewhat unpredictably, mainly due to rotation. The point is that the environment itself does not change dramatically and so it may be possible to find a way in which the graphical representation of the displayed environment also stays relatively static for simplified scene computation and rendering.

The ancient Greeks found a similar problem in trying to describe the motions of the planets and stars. They had a concept of planets moving relative to stars and to the Earth and stars moving relative to the Earth. A model involving crystal spheres was developed. In this model the heavenly bodies were painted onto various layers of crystal spheres which were centred on the Earth and could move relative to one another. Objects on close spheres move more compared with objects on distant spheres. Various complex models of the movements of heavenly bodies were formulated in terms of these spherical shells surrounding the Earth. We now know that much of the observed motion of the stars is due to the rotation of the Earth but since the observed motion is relative, a successful model centred on the Earth is possible.

We can use a similar model for a virtual world. Conceptual spheres centred on the user would have the objects of the virtual world represented on them. Objects which are to be represented close to the user can be displayed as part of an "inner" sphere and more distantly represented objects displayed on an "outer" sphere. According to this model, in essence all possible views from the user's position are already rendered onto the spheres and it only remains to display appropriate views as seen by the user. A rotation merely involves displaying a different portion of the sphere. A translation will require some updating of the spheres, however the display of objects represented on outer spheres will change relatively less than objects on inner spheres and hence may require little or no updating. Of course changes within the virtual environment will have to be reflected in the spheres but typically only a subset of the spheres will be involved.

A model is described herein in which the images of the virtual world are rendered onto a surface or surfaces surrounding the user. It may appear that in so modelling the world a larger processing bottleneck has been created, both in generating the images and rendering them, and in selecting the appropriate view to display. On first examination it may appear that significantly greater rendering overheads such as scan conversion, clipping etc. are incurred than a conventional system, however this is rarely the case and is only found if the scene has polygons evenly spread out in all three dimensional directions. With a viewport independent display memory one must scan convert all polygons received. This is the worst case scenario for a conventional system but for guaranteed interactive response one must allow for the worst case. Many conventional rendering systems are designed to cope with situation approaching the worst case scenario. The rendering overheads for a conventional system may be reduced if the user is not looking at a complex part of the scene, however as the system has no control over the user's choice of direction for viewing it is fair to assume the user is looking at the most polygonally dense section of the world. The viewport mapping is indeed computationally expensive and thus a hardware circuit is also described directed to performing the mapping operations.

In accordance with the present invention there is provided a method for displaying an image comprising:

storing image data representing images visible from at least substantially any rotational orientation of a fixed viewpoint;

determining a rotational orientation of a viewing means;

selecting a portion of said stored image data on the basis of the determined rotational orientation; and displaying an image with said viewing means utilising said selected image data.

The invention also provides a method for displaying an image on a viewing means comprising:

storing image data representing images projected onto a surface at least substantially encapsulating a central viewpoint;

selecting a portion of said stored image data on the basis of an orientation of the viewing means; and displaying an image with said viewing means using the selected image data portion.

The invention further provides a method for displaying an image to a user, comprising:

storing image data representing views for at least substantially any rotational orientation of the user;

sensing a rotational orientation of the user;

selecting a portion of said image data on the basis of said sensed rotational orientation; and displaying an image to the user utilising said selected image data.

The invention also provides a method for selecting image pixel data for an image to be displayed, comprising:

determining a rotational orientation for the image to be displayed; and addressing stored image pixel data on the basis of the determined rotational orientation.

The invention further provides a method for addressing image pixel data comprising:

generating and storing image pixel data representing a panoramic view encompassing views from a plurality of rotational orientations from a fixed viewpoint;

sensing a rotational orientation of a viewing means;

addressing pixels of the stored image data on the basis of the sensed rotational orientation and raster scanning signals for the viewing means.

The invention still further provides a method for reducing rotational latency in a bead mounted graphical display system, such as for virtual reality applications, comprising:

generating and storing digitized image data for reproducing images representing a plurality of orientational views of a scene visible from a fixed viewpoint;

sensing the orientation of a head mounted display means; and selecting image pixel data from the digitized image data for display on the head mounted display means, the image pixel data being selected synchronously with the display thereof and on the basis of said sensed orientation.

In accordance with the invention there is also provided an apparatus for displaying a digitized graphical image, comprising:

a storage means for storing image pixel data representing a panoramic view from a viewpoint;

a head mounted display means including a display device and means for generating an orientation signal representative of the rotational orientation of the display means; and means for selecting image pixel data from the storage means on the basis of said orientation signal and a pixel scanning signal for the display means, and generating display signals for controlling said display device on the basis of the selected image pixel data.

The invention also provides a graphical simulation system comprising:

a digital memory for storing data representing a panoramic view rendered onto a rotational surface at least substantially surrounding a viewpoint;

a display means capable of rotational orientation changes and including means for generating data indicative of the rotational orientation of the display means; and a display controller for retrieving image data from said memory in accordance with rotational orientation data from the display means so as to control the display means to generate an image representing a view from the viewpoint at the rotational orientation of the display means.

There is also provided in accordance with the invention, a display controlling apparatus for use with a display apparatus including imaging means for displaying pixelated image data to the eyes of a user and rotational orientation sensing means for sensing the rotational orientation of the user's head, comprising:

a display memory buffer for storing image data representing a panoramic image rendered onto a notional surface substantially surrounding a viewpoint; and a display controller for accessing image data in the display memory buffer in accordance with the sensed rotational orientation of the user's head, and for generating display signals for said imaging means to display an image corresponding to a view of said panoramic image from the sensed rotational orientation at the viewpoint.

It will be appreciated that the panoramic view represented by the stored image data may include views extending 360 degrees in each rotational plane from the viewpoint, and that, on the basis of a sensed rotational orientation, for example from the viewing means itself, a portion of the stored image data is selected corresponding to a limited viewport in the direction in which the viewing means is facing.

Preferably the display controller includes a pixel scan generating means which generates a pixel scanning signal for the imaging means, the image data being accessed by the display controller on the basis of the pixel scanning signal as well as the sensed rotational orientation. On one form of the invention the display controller includes a means for generating first vector data representing a vector corresponding to said rotational orientation with respect to said rotational surface, the image data being accessed on the basis of a computed intersection of said vector with said rotational surface.

Preferably, said display apparatus includes separate imaging means for each eye of the user, the display controlling apparatus being provided with separate display memory buffers for storing image data representing panoramic images rendered onto separate said notional surfaces spatially displaced by a nominal eye separation distance.

In one form of the invention, where the display apparatus involves a distorting optical lens, a pixel screen location for the next pixel to be displayed on the imaging means is used as input to a lens correction means which produces second vector data representing a viewpoint of the user. The second vector data is then utilised together with said sensed rotational orientation to generate third vector data indicative of the pixel screen location relative to said notional surface. The display controller can further include means for computing an intersection of the vector represented by said third vector data with said notional surface, and means to map the computed intersection point to an address in said display buffer memory to enable retrieval of stored image data for display at said pixel screen location. Preferably this process is carried out synchronously with the display of pixels on said imaging means.

A plurality of display memory buffers may be provided, each containing different portions of the panoramic image. In this case the display controller is constructed to enable simultaneous access to stored image data in each display memory buffer and includes means for comparing the accessed image data on a pixel by pixel basis in order to determine which image data is to be used for generating said display signals. This may be done, for example, on the basis of a stored z-value for each pixel which represents the relative "depth" of the pixel within the (z-dimensional) image which is to be portrayed.

Portions of the panoramic image can also be arranged in the plurality of display memory buffers according to the likelihood of the image portions to change within a given time period. For example, in many virtual reality systems objects within the images presented to a user are subject to animation. Thus, in one form of the invention the image data representing static or slower moving objects is stored in a display buffer memory which is separate from the image data representing faster moving objects. Furthermore, the display buffer memory in respect of the slower moving objects can be updated less frequently than the display buffer memory in respect of the faster moving objects.

In accordance with the invention, there is also provided a graphical display controller pipeline for generating pixel control signals for a display means, comprising:

a first stage for generating pixel vector data on the basis of a pixel screen location of the display means and rotational orientation data;

a memory location conversion stage for addressing image data corresponding to said pixel screen location and rotational orientation data on the basis of said pixel vector data; and a pixel generation stage for retrieving the addressed image data and generating therefrom pixel control signals for the display means.

The invention also provides a method for generating pixel control signals for a graphical display means, comprising:

generating pixel vector data on the basis of a pixel screen location of the display means and rotational orientation data;

addressing stored image data corresponding to said pixel screen location and said rotational orientation data on the basis of said pixel vector data; and accessing the addressed image data and generating pixel control signals therefrom.

This aspect of the invention is particularly applicable for use with, for example, a head mounted display means which presents images directly to the eyes of a user and which includes sensing means to provide rotational orientation data which relates to the orientation of the display means. In one form of the invention there is provided a means for compensating for distorting lenses which may be provided in the head mounted display means, whereby the pixel screen location is transformed to first vector data indicative of the screen location with respect to the user's viewpoint (eg: the user's eye), taking into account the lens distortions of the display means. The transformation is conveniently achieved by way of a look-up table containing data relating to the lens distortions, which receives the screen location as input and produces said first vector data as an output. Preferably the first vector data is then combined with the rotational orientation data by a matrix multiplication process to produce said pixel vector data, the pixel vector data being indicative of the position of the pixel screen location relative to the user viewpoint with respect to a fixed coordinate system within which the display means is rotationally moveable.

Preferably the image data comprises a stored representation of an image which can be mapped onto a notional surface which is fixed with respect to said coordinate system and at least substantially encapsulating said viewpoint, wherein image data is addressed by computing an intersection point of the vector represented by said pixel vector data with said notional surface, and mapping the intersection point to a corresponding address or set of addresses for the stored image data. In one form of the invention the notional surface onto which the image represented by the image data is mappable is a cuboid surface, although many other surface topologies are also contemplated as being applicable, such as a spherical surface.

The image data can be contained in a single display memory, or can be distributed over a plurality of display memories each of which are mappable onto said notional surface and which are addressable individually and simultaneously. For example, an image composition technique can be used wherein first and second image data from separate display memories are accessed with the address from the memory location conversion and a comparison and selection made between the first and second data for generation of the pixel control signals. In one form of the invention the image data includes a depth field indicative of the relative depth of the corresponding pixel in the image to be displayed, wherein the comparison process as between the first and second image data compares the depth field and selects the image data having the smallest relative depth (ie: notionally closest to the viewpoint) for the generation of the pixel display signals.

In order to represent dynamic changes in the image displayed to the user, in addition to rotational orientation (or viewpoint) changes, the image data stored in the display memories can be periodically updated. For this purpose, one or more rendering engine may be provided to compute the image data to be stored in the display memories. In a particularly advantageous form of the invention, the image data is hierarchically stored amongst the display memories whereby image data with a short validity period is stored in a different display memory from image data with a long validity period. In this way it is possible to update the display memory containing the short validity period image data more often than the long validity period image data. This is particularly useful for image data representing a scene wherein, for example, moving objects are displayed on a relatively static background. Thus the image data representing the foreground objects can be stored in one display memory and updated at a fast rate, whilst the image data representing the background is stored in another display memory which is updated less frequently, the two sets of image data being combined on a pixel by pixel basis using the image composition technique mentioned above. It will be appreciated however, that the relative depth (z-value) of the objects is independent of which display memory the corresponding image data is stored in since, in this instance the display memories are arranged according to the validity period of the objects contained therein, rather than any positional constraint. Thus, fast moving background objects would be stored in the same display memory as fast moving foreground objects. Alternative ways of determining which image data is to be stored in which display memory are also considered as being within the scope of the invention.

In order to avoid edge significant effects and image aliasing in the image presented to the user it is advantageous to provide an anti-aliasing means in the pixel generation stage. In this case the computed intersection point is utilised to address image data relating to a plurality of adjacent pixels (eg: four adjacent pixels in the form of a square) and a linear interpolation filter applied to obtain a final pixel data value which is used to generate the pixel control signals.

There is also provided, in accordance with the invention, a method for composing images in a graphic display system, comprising:
  periodically rendering and storing first image data in a first display memory at a first update rate;
  periodically rendering and storing second image data in a second display memory at a second update rate; and
  generating output image data on the basis of the first and second image data;
  wherein said first update rate is greater than said second update rate.

By updating the first image data which comprises a portion of the overall image at a faster rate than the second image data, it is possible to utilise the processing power of the computation apparatus which performs the image rendering more efficiently without degrading the quality of images produced by allocating portions of the image which change quickly to the first display memory and portions of the image which change slowly to the second display memory. For example, where the images to be displayed by the graphic display system comprise images of animated objects against a relatively static background, the image data relating to the animated objects can be allocated to the first display memory and the image data relating to the background allocated to the second display memory. More than two display memories can be provided, each having a different update rate, for storing a plurality of image portions which change with varying degrees of rapidity.

Where an object having an image which varies with time (such as by way of relative movement of the object) is to be rendered is the graphic display system the method may include the further steps of calculating an image validity time for the object on the basis of the time variation thereof, and selecting one of the first and second display memories for storage of the image data for the object on the basis of the image validity time and the update rates for the display memories.

The invention also provides a graphic display system comprising:
  at least one graphic rendering means for generating image data corresponding to stored object display information for objects to be displayed by the system;
  a plurality of display memories for storing image data generated by the at least one rendering means; and
  selection means for determining which of said plurality of display memories to store image data for a particular object on the basis of a characteristic of that object.

Preferably each of the plurality of display memories is periodically updated with image data from the rendering means, the length of period between updates being different as between different display memories. In one particular form of the invention, a plurality of display memories are provided each having a different update period of image data from the rendering means, wherein the selection means determines the display memory to store image data for an object based on a computed validity period for the object which is dependent upon relative movement of the object within the graphic scene which is to be displayed by the system. In a preferred form of the invention the selection means selects a display memory for an object which has an update period which is less than the validity period for the object.

The invention further provides an image data processing apparatus, comprising:
  a rendering engine for generating first and second image data;
  first and second storage means for storing image data;
  selection means for selecting which of the first and second image data to store in the first and second storage means; and
  an image composition means for comparing equivalent pixels from said first and second image data and selecting therebetween for generation of output image data;
  wherein said rendering engine generates the first and second image data at different average rates.

In one form of the invention the rendering engine generates the first and second image data periodically, the period being different as between the first and second image data. Advantageously the first and second image data can be rendered by separate rendering engines and then used to form said output image data at the time an image is to be displayed.

The invention also provides a method for processing stored image pixel data for display, the stored image pixel data being mappable onto a notional display surface, comprising the steps of:
  determining an intersection point of a viewport vector with said notional display surface;
  accessing stored data for a plurality of pixels identified as adjacent the intersection point when mapped to said display surface; and
  interpolating the accessed data on the basis of the relative positioning of said intersection point and the adjacent pixel mapping locations to generate an output pixel value.

Preferably four pixel values adjacent to said intersection point are accessed and interpolated to generate said output pixel value.

There is also provided, in accordance with the invention, a display memory architecture wherein adjacent pixel values of a graphic image are stored in separate memory devices so as to be simultaneously accessible.

Providing a memory architecture of this type makes it easier to implement a pixel interpolation scheme, such as may be desirable for anti-aliasing, since pixels which are logically adjacent one another in an image (ie: adjacent in rows and columns) can be fetched simultaneously for processing. This is particularly advantageous for a pipelined system.

The invention is described in greater detail hereinafter, by way of example only, with reference to the accompanying drawings, wherein:

FIG. 4 is a more detailed block diagram of a conventional graphical display system;

FIG. 5 is a block diagram of a display system according to an embodiment of the invention;

Figure 14:
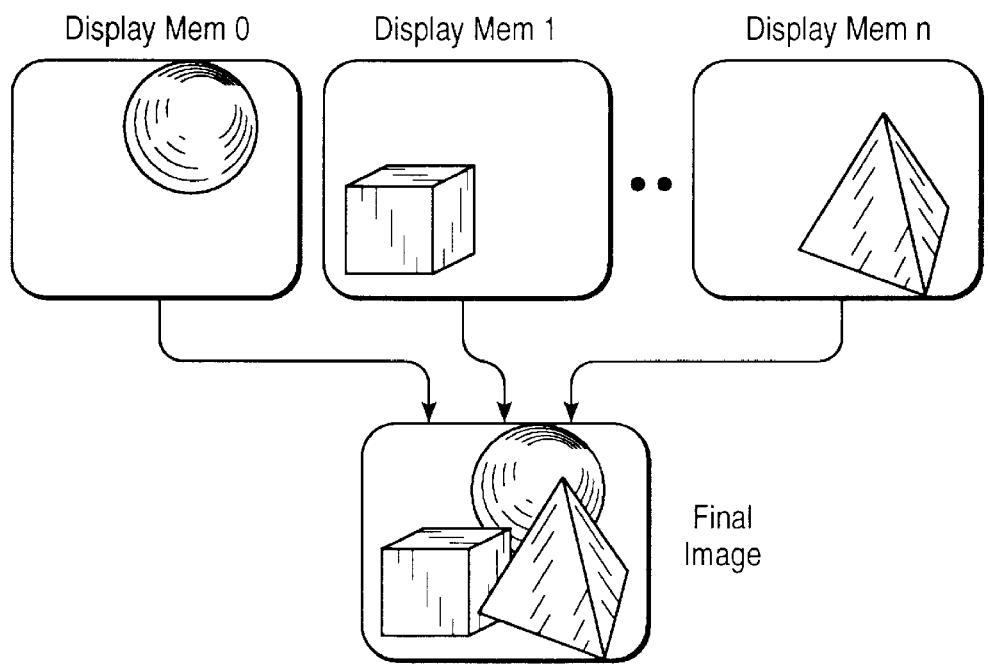
Figure 13A:
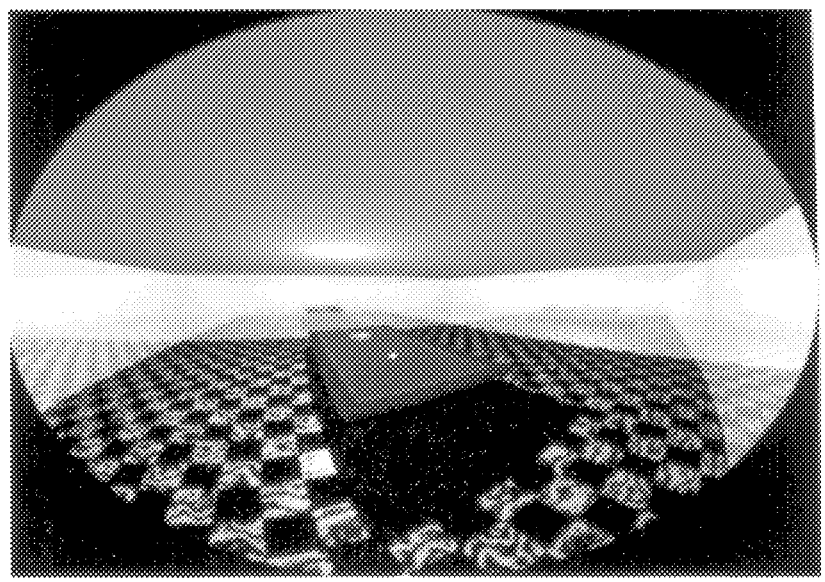
Figure 13B:
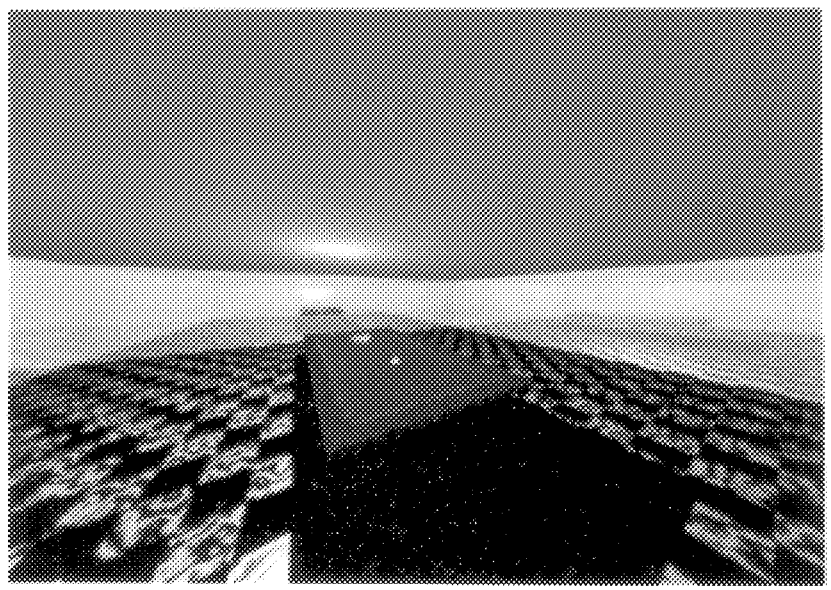
Figure 15:
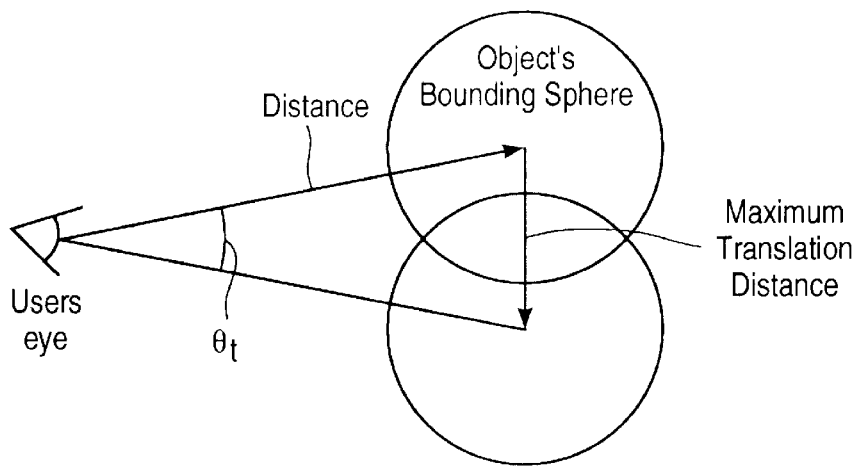
Figure 16:
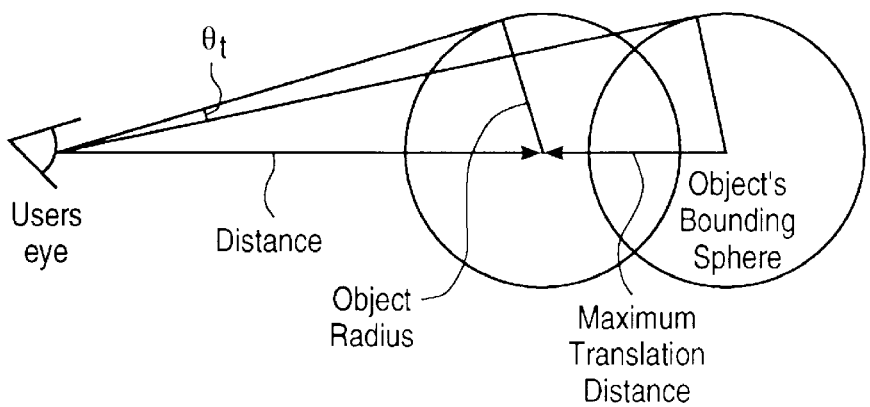
Figure 17:
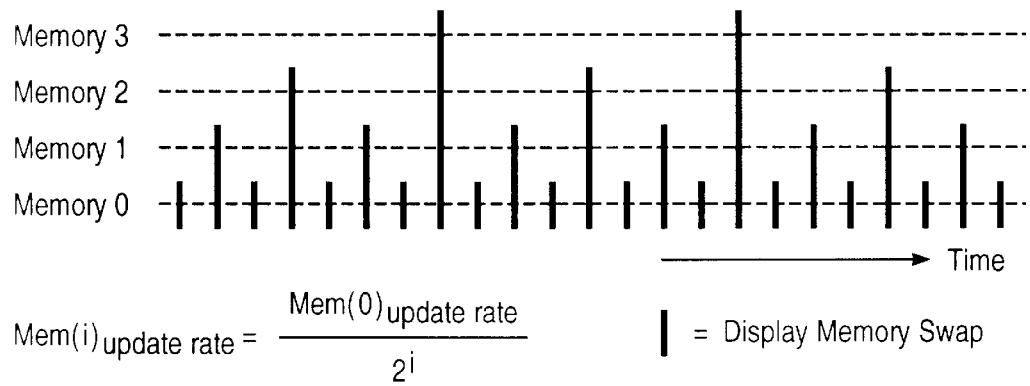
Figure 18:
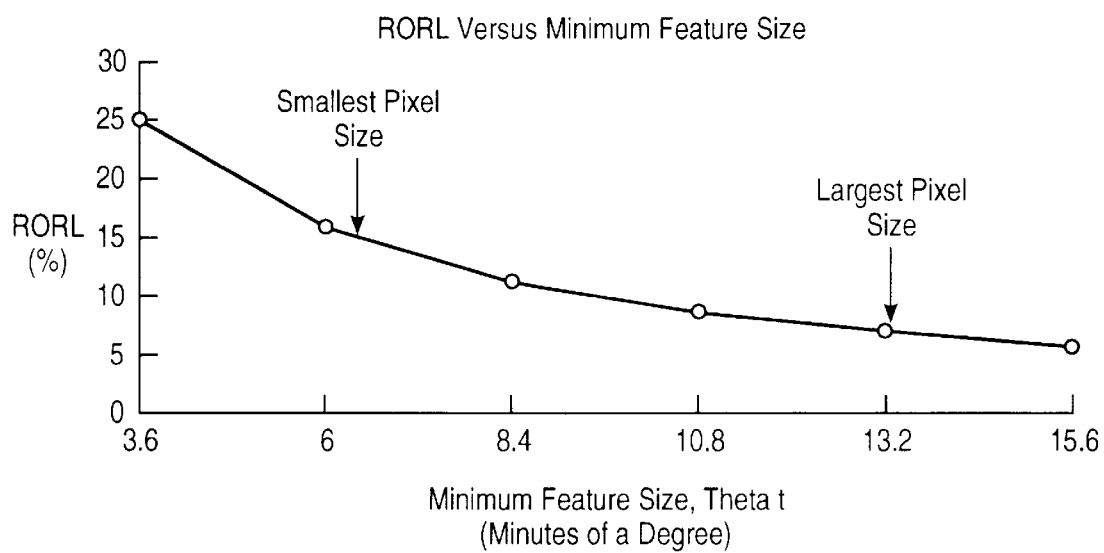
Figure 19:
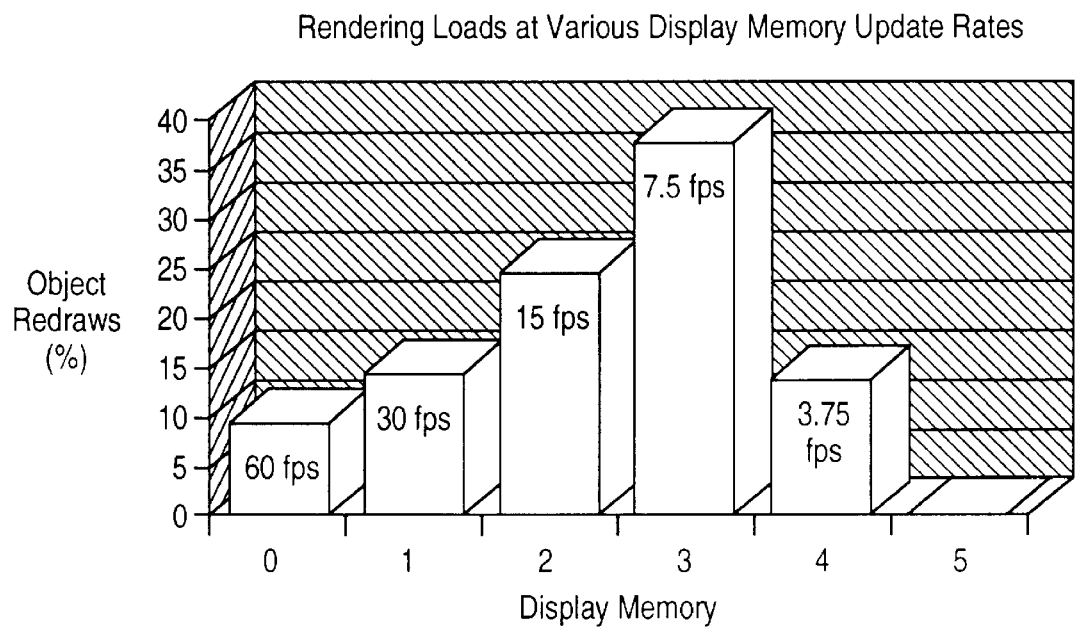
Figure 20:
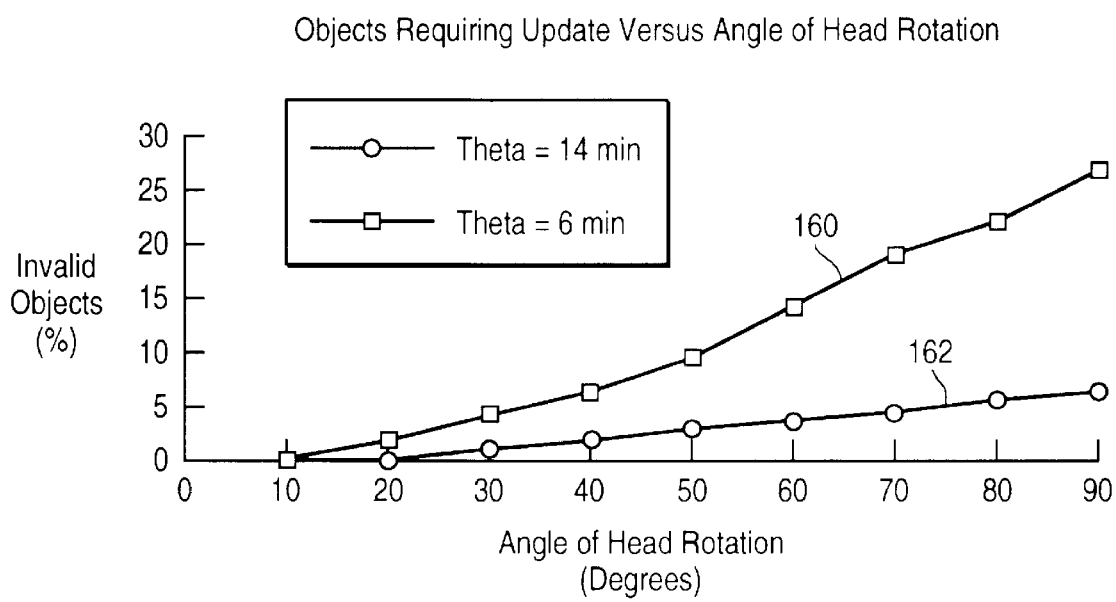
Figure 21:
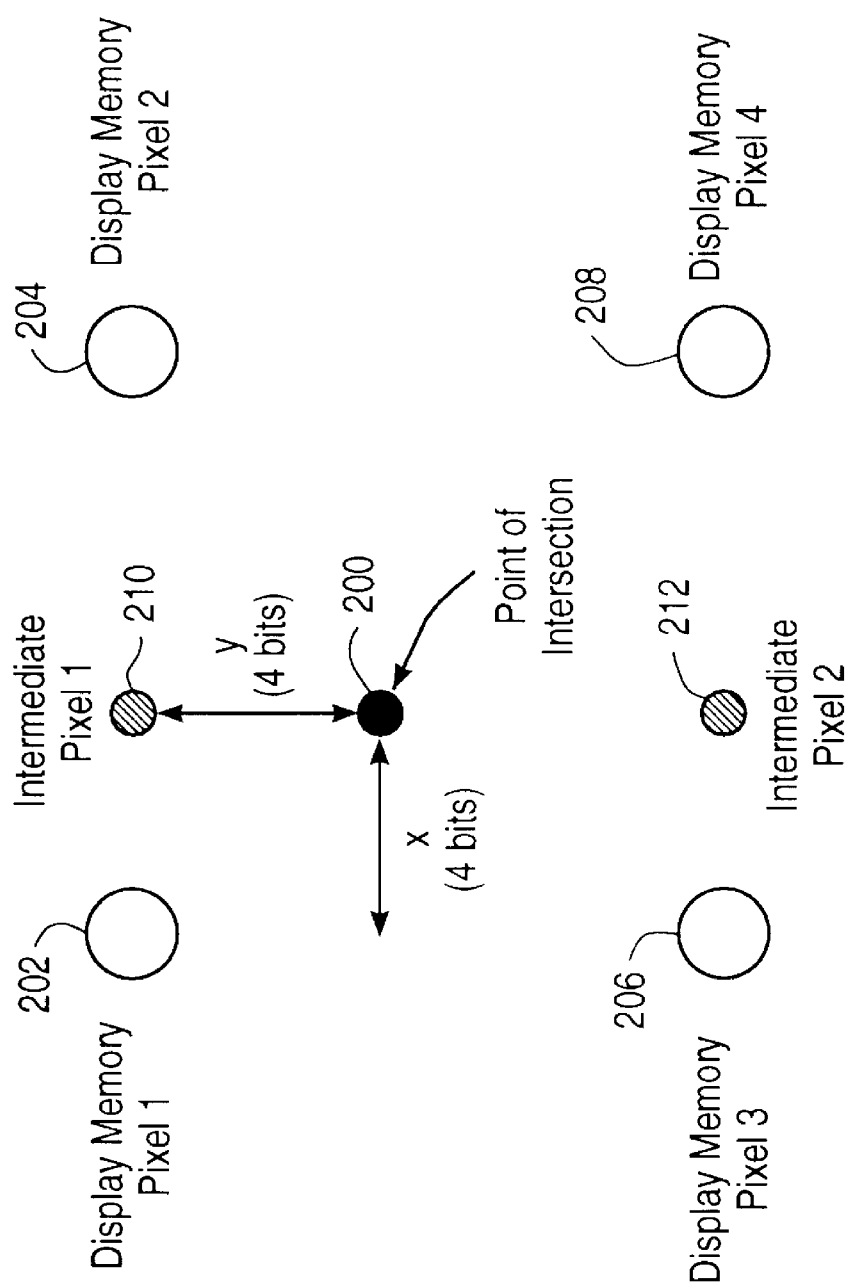
Figure 22:
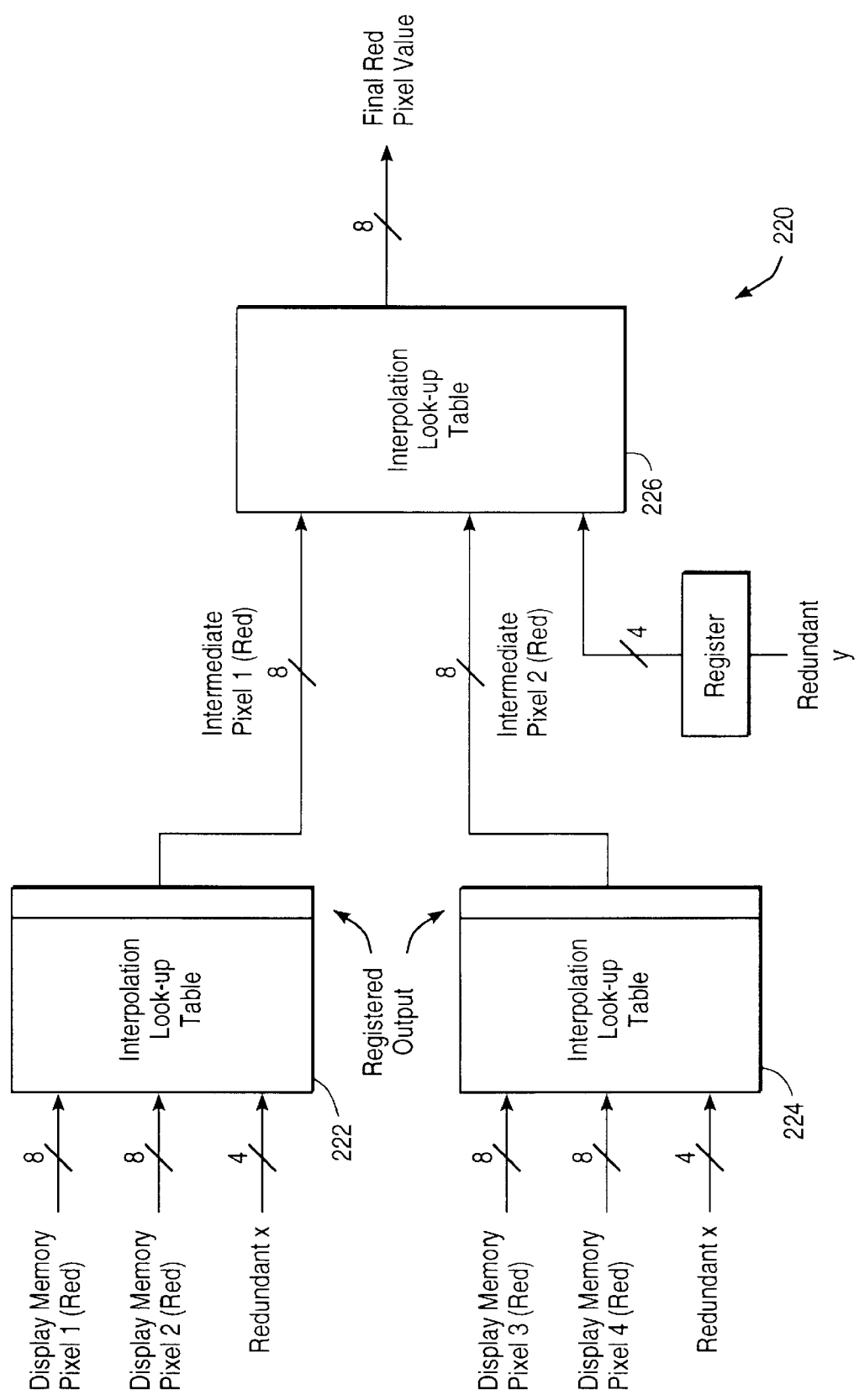
Figure 23:
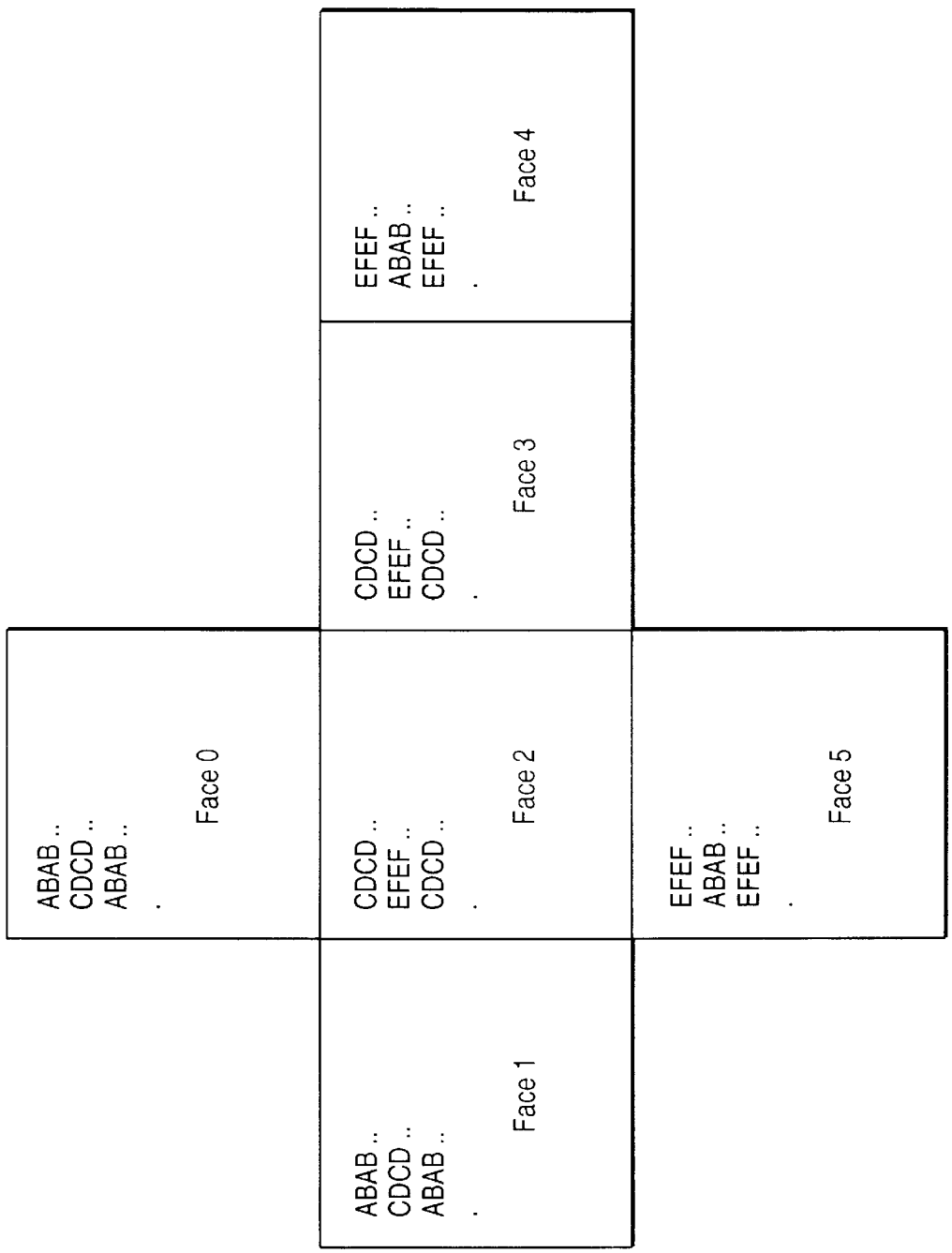
Figure 24:
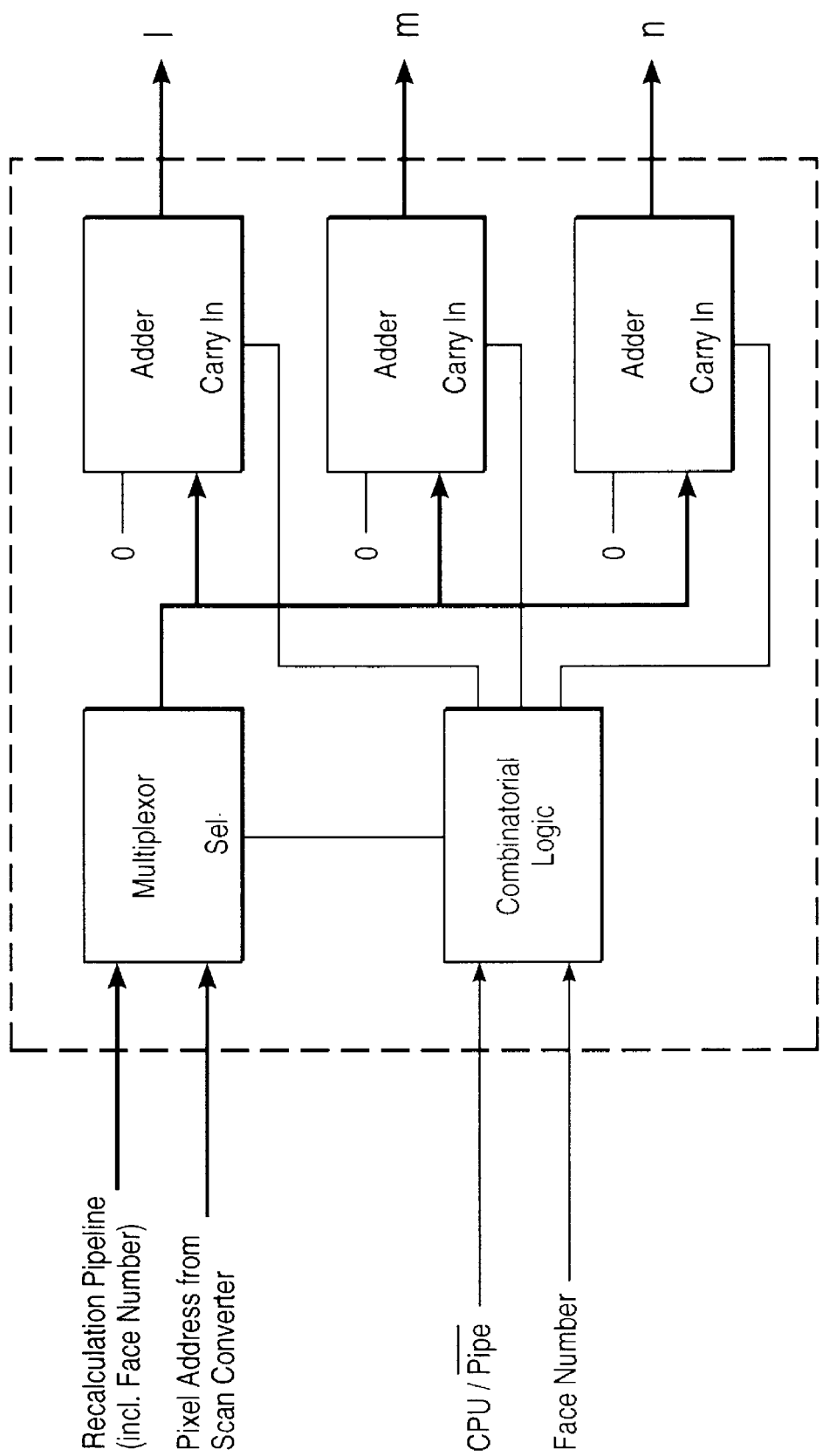
Figure 25:
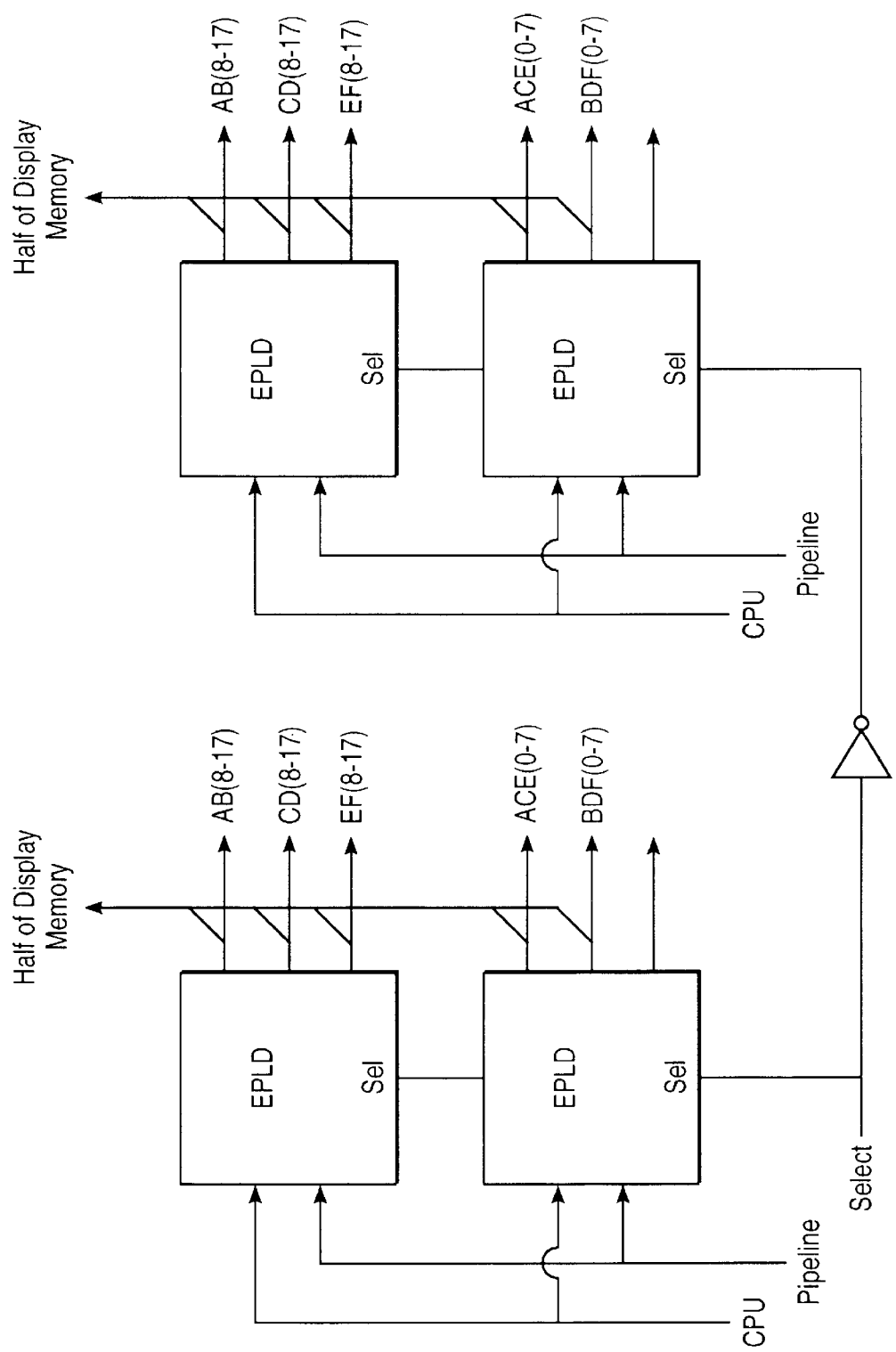

FIGS. 13(a)–(b) show images illustrating a wide angle lends lens mapping stage of the pipeline;

FIG. 14 is a block diagram illustrating an image composition stage of the pipeline;

FIG. 15 is a graphical representation for deriving a translational validity period for objects to be rendered in accordance with another form of the invention;

FIG. 16 is a graphical representation for deriving a size validity period for objects to be rendered;

FIG. 17 is a time line graph showing a relative sequence of display memory updates;

FIG. 18 is a graph of Relative Object Rendering Load (RORL) against minimum feature size for a graphical display system in accordance with an aspect of the invention;

FIG. 19 is a bar chart showing rendering loads at various display memory update rates;

FIG. 20 is a graph of the percentage of image objects invalidated against head rotation angle for various minimum feature sizes;

FIG. 21 is a diagram illustrating a linear interpolation strategy for reducing aliasing in accordance with another form of the invention;

FIG. 22 is a block diagram of a hardware structure for the linear interpolation strategy;

FIG. 23 is a block diagram of a display memory map showing segment organisation in accordance with another aspect of the invention;

FIGS. 24 and 25 are block diagrams of memory addressing circuits for the memory segment organisation of FIG. 23.

DELAYED VIEWPORT MAPPING

Figure 1:
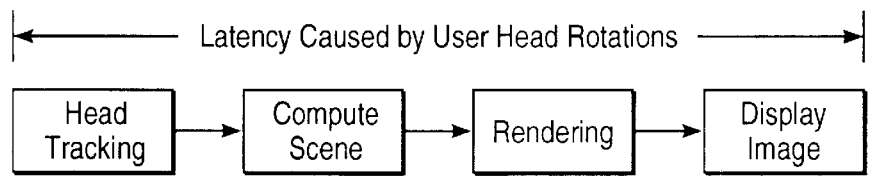
FIG. 1 is a block diagram illustrating latency to head rotations within a conventional virtual reality display system.

The nature of rotational latency within a traditional virtual reality display system is illustrated in the block diagram of FIG. 1. The steps which comprise the process for displaying an image begin with computing the user's head orientation utilising the head tracking apparatus. Once the head orientation has been determined it is then necessary to create the details of the scene which is to be displayed corresponding to that orientation. After creation of the scene the computationally expensive rendering process can commence. Upon completion of the frame drawing process the image is ready to be displayed. When the display process for the current frame has completely finished, the display process for the new frame may commence. It is apparent that in this form of virtual reality display system the rotational latency of the overall system is dependent upon the latency of each stage of the display process. Most particularly, the rotational latency is related to the time required to compute and render a new image each time an orientation change occurs.

Figure 2:
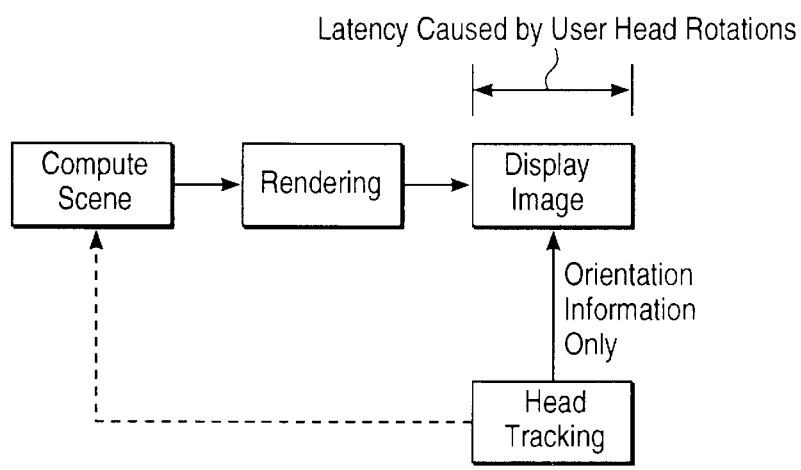
FIG. 2 is a block diagram illustrating head rotation latency within a virtual reality system according to one form of the invention.

By redesigning the display controller within a display system it is possible to perform useful computations as a pixel is being drawn. In particular, a new computer graphics display controller architecture which is suited to the requirements of head mounted virtual reality (V.R.) display systems is described in detail hereinbelow, which differs from standard display controllers in the nature of the video memory addressing mechanism. Rather than fetching pixels for display from the video memory sequentially, the fetch mechanism bases the pixel fetch location on the pixel's actual screen location (as seen through a wide angle viewing lens) and the orientation of the user's head. This means the viewport mapping is delayed until after the scene has been rendered. In effect the users head orientation is considered after the scene is drawn instead of before the scene is drawn, avoiding the rendering bottleneck. As a result, latency to user head rotation is based only upon the nature of the display device and the head tracking system. In comparison to FIG. 1, FIG. 2 is a block diagram of a new display system which illustrates the causes of rotation latency within the re-designed display controller.

Providing a stereoptic view of the scene complicates the issues involved in head rotation latency because some re-rendering is required. Although many researchers have found that providing low latency is much more desirable than stereoscopy, the display system described herein includes mechanisms for depth buffering so objects close to the user may be re-rendered to provide a stereoptic view of the object without the need for redrawing the entire scene.

When generating a scene for a virtual reality system there appears to be several processes being undertaken. For ease of reference, these processes have been divided roughly into two major categories. The first category is scene animation and encompasses processes such as object movement within the virtual world, user translation within the virtual world and lighting or shadowing changes within the scene. The second process is scene maintenance and refers to updating the display based upon user gestures such as head rotations. A Static Virtual Environment SVE is defined an environment in which only scene maintenance is required.

Traditional virtual reality display systems draw no major distinction between scene maintenance and scene animation, often scene maintenance being achieved through scene animation. The display system described herein in connection with various forms of the invention dedicates hardware within the display controller to the task of scene maintenance. The rendering engines may then use all of their resources for animations within the scene and initial scene creation.

Consider the computations required when a users head undergoes some form of rotation. The new scene presented to the user must either be regenerated in real time, updated from a previous image or have been pre-rendered.

Regenerating the scene in real time is the approach chosen by most virtual reality researchers. This approach requires no special purpose virtual reality application dependant hardware. As a result Silicon Graphics work stations are often used as rendering engines. This technique is inherently wasteful as the active lifetime of an image decreases as interactive latency is reduced.

Updating a previous screen is a technique which is more efficient and faster than regeneration. Generally, updates are achieved by scrolling the image to compensate for user head rotations with the rendering engine filling the gaps created by scrolling. Scrolling with three degrees of rotational freedom while compensating for wide angle viewing lenses requires substantial hardware within the display controller. Once built, this scrolling hardware allows no flexibility in the wide angle viewing lens mapping.

Pre-rendering an image may not at first appear to be a viable option, since motions of the user are not known in advance. However, it has been found that if a scene is rendered in a manner independent of the orientation of the user's head, it may be possible to decide the video memory fetch location of a pixel based upon the users head orientation. As a result, pre-rendered images may be continuously reused without computational penalty. In order to create an image which is to be reused, the image created must be independent of the viewing orientation of the users head. The task of orienting the image relative to the users head is then dedicated to the display controller and is performed at pixel display time.

In order to generate an entire scene independent of orientation the image can be thought of as being rendered onto an encapsulating surface surrounding the user's head. A spherical encapsulating surface has been contemplated, in which the spherical surface is mapped into display memory using a spherical coordinate system, with uniformly spaced $\phi$ units mapping to the columns and uniformly spaced $\theta$ values mapped to the rows of the display memory. Such a mapping scheme for the sphere results in varied pixel densities within the display memory. As such, an ellipsoid or cube may prove to be a better choice of encapsulating surface when considering uniformity of pixel storage within display memory.

All user translations, lighting and shadowing changes, stereoscopy and object animation require some form of redrawing. Any form of redrawing falls into the category of scene animation. Although the rendering engine is responsible for scene animation, the display controller accommodates depth buffers. This allows different sections of the scene to be rendered to different display memories ordered by depth. For example scarcely changing background scenery may be rendered to a background buffer and updated very occasionally relative to the frame rate, maybe once every few seconds. This is possible because the background image is rendered independent of the users head orientation. A foreground object which is undergoing vigorous animation may be drawn into a front buffer by itself. Since only one object needs to be redrawn as opposed to redrawing the entire scene, most of the rendering engine resources may be focussed upon drawing the one object. This results in a high update rate for the object and in very fluid animation.

Figure 3:
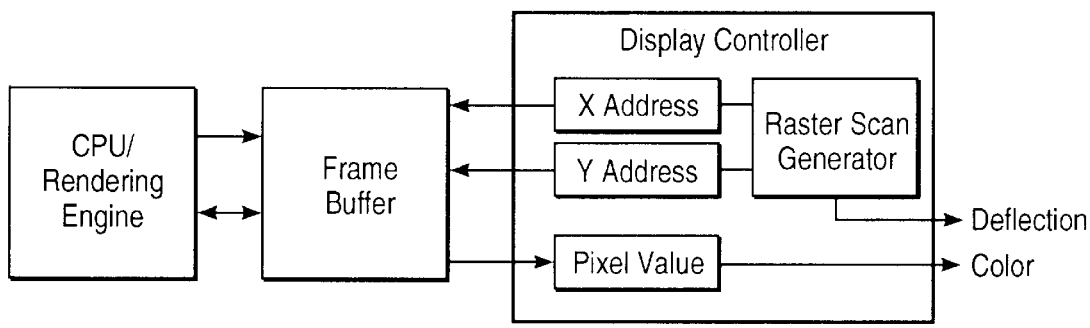
FIG. 3 is a block diagram illustrating the structure of a conventional graphical display system.

Display generation generally consists of two processes. The first process interfaces the video memory to the CPU and is referred to as the rendering engine. This stage may be implemented in hardware or software. The rendering engine, in effect, draws the image into the video memory. The second process sends the image drawn by the rendering engine to the display device and is referred to as the display controller. Such a system is shown in FIG. 3.

The purpose of a display controller within such a system is to provide a simple sequential counter which informs the video memory of the address of the next pixel to be displayed. Such a controller also determines the sizes and positions of the visible sections of the display as well as producing the horizontal and vertical synchronisation signals required by display devices.

Although many published projects focus on improving the performance of the rendering engine, or providing faster access to the frame buffer, little attention has been given to optimising the display controller for the needs of a virtual reality display system. In order to maintain and interact with high quality virtual environments, the described embodiments of the present invention focus on the display controller rather than the rendering engine. As a result a hardware system has been devised which is devoted to scene maintenance, allowing the rendering engines and available CPU power to concentrate on scene animation.

In effect, a display system constructed in accordance with embodiments of the present invention allow creation and storage of a scene in a virtual environment which comprises images encompassing any possible view from the user's position in the virtual world. In other words, the stored scene includes images of the portions virtual environment which are to the sides, behind, above and below as well as in front of the user. The particular image which is to be displayed to the user at any given time is retrieved from the scene storage corresponding to the direction in which the user's head is oriented. Since the entire scene is stored, changes in head orientation merely requires a different portion of the storage to be accessed. To provide for stereoptic viewing, separate scenes for the left and right eyes can be stored and accessed parallely. Also, depth buffering of different portions of the scene can be used, wherein relatively static background images are stored separately from relatively changeable foreground images, with the foreground image portions being overlayed on the background image portions at the time of display. Since the portion of the scene to be displayed to the user (the "viewport") need only be retrieved from storage, this operation can take place as memory address mapping procedure, synchronous with the pixel display rate of the display device. Therefore, the new display controller directly reduces latency to user head rotations by fixing user head rotation latency to the refresh period of the display device. Latency to other forms of interaction such as user translations through the virtual scene, head motion parallax and stereoscopy are indirectly reduced through the use of image overlaying.

Image overlaying or image composition is a technique often used by low-cost non-head mounted display graphics systems such as video games to increase the apparent realness of a scene. It is also often used by high performance systems to increase the maximum rendering rate. Different sections of the visible scene are drawn into separate display memories then overlayed to form a final scene (a similar technique is sometimes used when creating cartoons to reduce the drawing required per display frame). When translating through the virtual scene, each display memory may be updated independently. Close objects receive more of the rendering engine's time than less frequently changing background objects. Image overlaying generally does not work very well with conventional display controllers in virtual reality systems as user head rotations invalidate all display memories including those containing background images. This mass invalidation occurs because all of the images in the display memories are rendered with a fixed viewport mapping so when the viewport changes due to a user head rotation all of the images have an incorrect viewport mapping. The new display controller does not suffer the same drawback since the rendered scenes in display memory are independent of the viewport mapping orientation and do not become invalid when the viewport mapping changes. The only exception to this is when providing stereoscopy for large orientation changes. Some re-rendering of close objects may be required for an accurate stereoscopic view of the scene.

FIG. 4 shows a block diagram of a known image generation and display system 10 which performs two processes represented by cycles 12 and 14. The first process, called rendering, draws images into a display buffer memory 16, and is performed in the update cycle 12. The second process sends the image data in the display buffer memory 16 to a display device 18, and is performed by a display controller operating the refresh cycle 14. As can be seen from the block diagram of FIG. 4, the rendering process in the update cycle can be considered as comprising a number of individual steps 20 to 24, including accessing a shape database (20), geometric transformation of the shapes retrieved (21), acceptance or rejection of transformed shapes (22), determination of shading and reflection characteristics depending upon perceived light (23), and clipping of the transformed shapes forming the image (24). After rendering of the image the viewport mapping takes place at stage 26 the final construction of the image to be displayed is formed, and is then scanned at stage 30 for conversion to a format which is applicable for display on a raster scan display device 18. On the other hand, the refresh cycle 14 is carried out synchronously with the image display rate on the display device 18, which merely comprises addressing the pixels in the display buffer memory in accordance with the raster scanning sequence (stage 32), and comprising the image from the various image layers of stage 34 (described in greater detail hereinafter) to pass each pixel value to the display device 18.

From the above, it can be ascertained that an update cycle has occurred when all required primitives in a scene have been drawn into display memory, whereas a refresh cycle has occurred when an image in the display memory 16 has been sent to the display device 18. Conventional virtual reality display systems bind the latency associated with user head rotations to the period of the update cycle. While this has the obvious advantage of not requiring any specialised hardware, latency tends to suffer as the update cycle period can often be lengthy, unpredictable and dependent on scene complexity.

The delayed viewport mapping display system architecture of the present invention makes it possible to bind rotational latency to the refresh cycle period which tends to be short, fixed in length and independent of scene complexity. FIG. 5 is a block diagram of such a display system, showing how the viewport mapping stage 26 has been shifted from the update cycle 12 of display system 10 to the refresh cycle 14' of the new display system 10'. The rendering process of the update cycle 12' in system 10' is essentially equivalent to the rendering process of system 10, however no mapping of the image onto the viewport takes place during the update cycle 12'. Instead, the refresh cycle 14' has been altered to accommodate mapping of the rendered image onto the selected viewport, with reference to the user head orientation data available, during the image refresh cycle. The refresh cycle 14' shown in the display system 10' in FIG. 5 also has some additional stages which are described in greater detail hereinafter. Namely, the pixel addressing stage 32, which relates to the scanning screen location for the display device 18, provides output to a wide angle lens correcting stage 38. The wide angle correction stage 38 is described in detail below and may comprise, for example, a look-up table with an entry for each pixel of the display device 18 to provide compensation for wide angle lens components which may typically be provided in virtual reality viewing equipment. Following generation of a pixel address (stage 32), and the wide angle correction stage 38 (if required), is the viewport mapping stage 26 which received head orientation input data from the head tracking apparatus. The viewport mapping stage in this instance generates a vector which can be utilised by the pixel location stage 40 to identify the address of a pixel to be displayed in the display buffer memory 16. Thereafter, the image composition takes place by overlaying various image layers (stage 34), as described in greater detail elsewhere, before passing an output signal to an anti-aliasing stage 36. The anti-aliasing process carried out at stage 36 immediately prior to display on the display device at stage 118 ensures that noticeable aliasing (ie: the occurrence of jagged lines and edge effects), which may result from sampling quantisation, is reduced in the final displayed image.

In a display system constructed in accordance with the invention, since viewport mapping is performed after rendering, the image in display memory should completely encapsulate the user's head. As mentioned previously, many different encapsulating algorithm requires little or no modification. As mentioned, FIG. 6(*a*) depicts a virtual environment scene rendered onto the surface of a cube and FIG. 6(*b*) depicts an image from a head orientation changes is determined by how long it takes to select the required portion of the encapsulating surface and write the image data to the display device. Where the encapsulating surface is chosen to be spherical, the selection of the appropriate region of the sphere to display can be modelled as projecting rays from the viewpoint onto the surface of the sphere so defining the area to be seen. Alternatively one can view the process as one of changing coordinate systems from a real world to an encapsulating (eg spherical) world. The coordinate transformation indeed requires a great deal of computation for each pixel to be displayed, and would most likely be infeasible using present day software techniques. However, the approach is ideal for a pipelined hardware implementation which, while using relatively fast hardware components, has a fairly simple structure and can be built relatively economically.

Investigations of a hardware design based on a spherical system have been found to have some annoying characteristics. Firstly, in mapping a sphere onto a memory array one tends to waste a lot of memory or else have a very complex mapping scheme. Second, the apparent sizes of pixels in a sphere vary greatly as one moves from equator to the poles. Third, the coordinate transformations involve trigonometric functions which are moderately expensive to implement. By far the dominant issue is the first in that much more display memory is required in a spherical topology than a conventional graphics system, and since accessing in a regular pattern is not possible, it is necessary to use relatively fast and expensive memory.

The basic delayed viewport mapping model (FIG. 5) will essentially work for any surface surrounding the user. A spherical surface is intuitively simple in that every point is equidistant from the user at the centre, however other surface topologies, such as a tetrahedron have also been contemplated. Eventually, a cubic encapsulating surface model topology was chosen. A cubic surface has advantageous properties in that no memory is wasted since the constituent surfaces can be mapped directly onto a two dimensional memory array as found in conventional memory chips. The coordinate transformations are also much simpler in that the are linear and can be implemented essentially with a matrix multiplication. Pixel sizes do not vary as much as for a sphere. While there may be some concern about strange effects occurring in corners and edges these have been shown not to be significant.

Figure 6A:
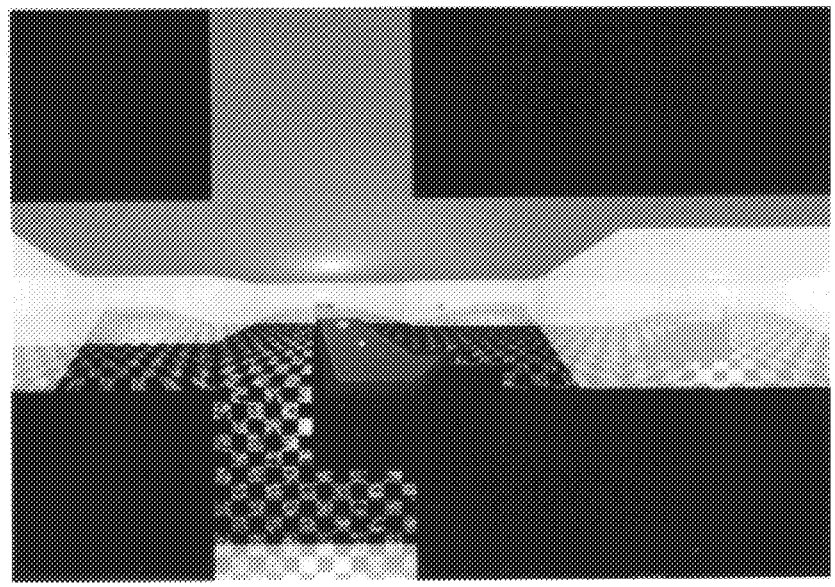
FIG. 6(a) shows a panoramic image from a display memory according to the invention.
Figure 6B:
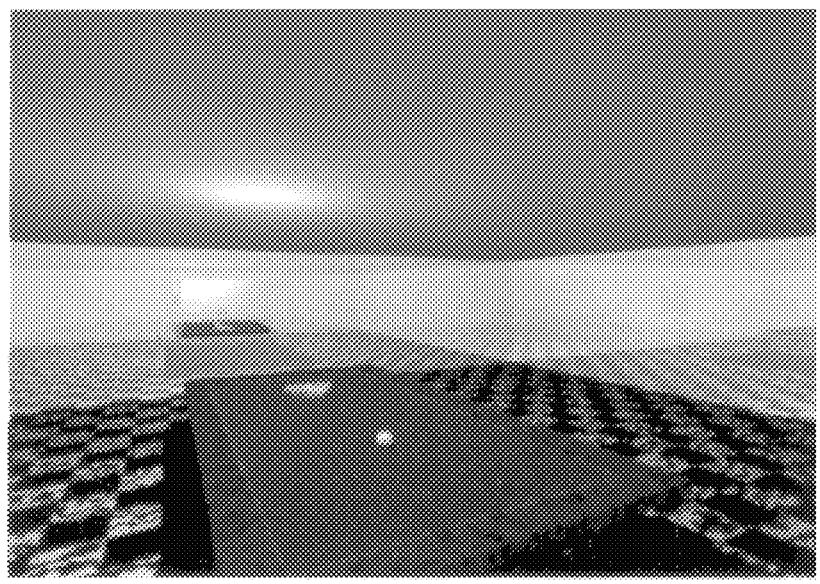
FIG. 6(b) shows a view from the stored image from a particular orientation.

In view of the above, the surface of a cube centred at the user's bead is the chosen topology for storing images within the display memory, which is described in detail hereinafter. FIG. 6a shows a flattened scene constructed from a cubic surface topology as it is stored in display memory, as well as an image from the scene at an arbitrary orientation shown in FIG. 6(b). hand side of the pool table in the display memory scene is not seen in the image created for display.

ADDRESS RECALCULATION PIPELINE

Traditionally the display controller (see FIG. 3) performs relatively simple computations, however the operations performed by the controller may be made more complex if the computations can be pipelined. For currently available medium resolution graphic displays devices with resolutions in the order of 640 pixels horizontally and 480 pixels vertically, a new pixel must be displayed approximately every 40 nanoseconds.

The display control and display output processes may in fact be considered as a two stage pipeline in which the first stage generates the address of the current display pixel for the video memory and commences the memory access sequence while the second stage sends the output of the previous access to the physical display device. Traditionally this pipeline is two stages long however there is no reason why the display pipeline may not be extended beyond two stages so as to include complex operations such as non-sequential pixel address computations, depth buffer comparisons and the like, so long as the pipeline throughput is comparable with a desired display rate for the pixels. Within the presently described implementation the pipeline, dubbed the Address Recalculation Pipeline, is extended to eight stages. Each stage or group of stages is discussed hereinbelow.

In view of the pixel display rate mentioned above, the address recalculation pipeline must have a throughput of 1 result every 40 ns once the pipe is full. As there are no stage interdependencies within the pipeline no pipeline stalls occur so pipeline filling need only occur once. In our implementation we use the horizontal retrace time as well as the time the raster spends in non-display regions of the screen to fill the pipeline. The pipeline takes approximately 300 ns to fill which is a delay one order of magnitude less than the horizontal retrace signal. This means that there is plenty of time to fill the pipeline.

The address recalculation pipeline uses hardware which performs orientation viewport mapping post rendering. That is, the orientation mapping occurs after a scene has been rendered rather than as the scene is being rendered.

Figure 7:
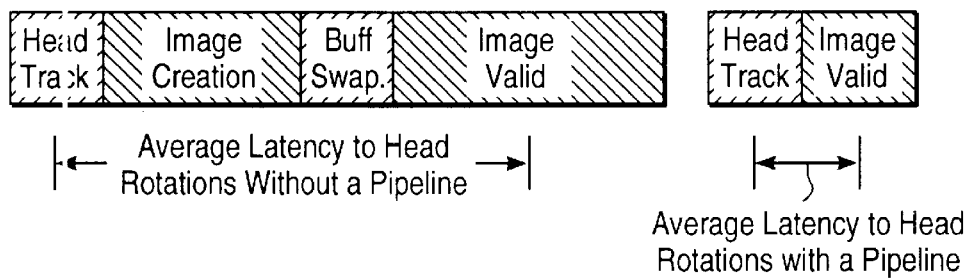
FIG. 7 is a diagram illustrating relative head rotation latencies in a conventional display system and a display system according to an embodiment of the invention.

A significant advantage of the pipeline is that the update rate for user head rotations is bound to the update rate of the display device (usually 60+ Hz) instead of the rendering frame rate. Also, the latency associated with the address recalculation pipeline does not include rendering time and double buffer swap delays. The orientation of the view the user sees does not need to be known until the first pixel is to be sent to the display device. This means the images presented to the user is based on the most up to date head tracking information. The nature of the latency related to head rotations is depicted in FIG. 7.

In order to perform viewport mapping after rendering, the rendered view must completely encapsulate the user's head, so when the user's head orientation changes the view from the new orientation has already been rendered and the address recalculation pipeline presents the user with the new view computed from the pre-rendered image in the system's display memory. The surface of a cube was chosen as the encapsulating rendering surface after considering many possible candidates, as the cube results in a moderately simple hardware implementation and has fewer aliasing artefacts than most other surfaces. The cube's greatest advantage however is in its associated rendering simplicity. The surface of the cube may be rendered to by rendering to six standard viewport mappings (up, down, left, right, front and back). Thus most standard rendering algorithms require little or no modification. As mentioned, FIG. 6 depicts a virtual environment scene rendered onto the surface of a cube together with an image from a particular orientation created by the address recalculation pipeline from the rendered scene.

The architecture of the address recalculation pipeline differs from mainstream architectures in the nature of the pixel addressing mechanism. In a conventional display system, pixels to be displayed on the output device are fetched from the display memory sequentially. All logically adjacent pixels in the display memory appear adjacent on the display device. The address recalculation pipeline is different in that rather than fetching pixels sequentially, pixels are fetched from display memory based on the pixel's screen location and the orientation of the user's head. The distortion due to wide-angle viewing lenses can also be compensated for.

Figure 8:
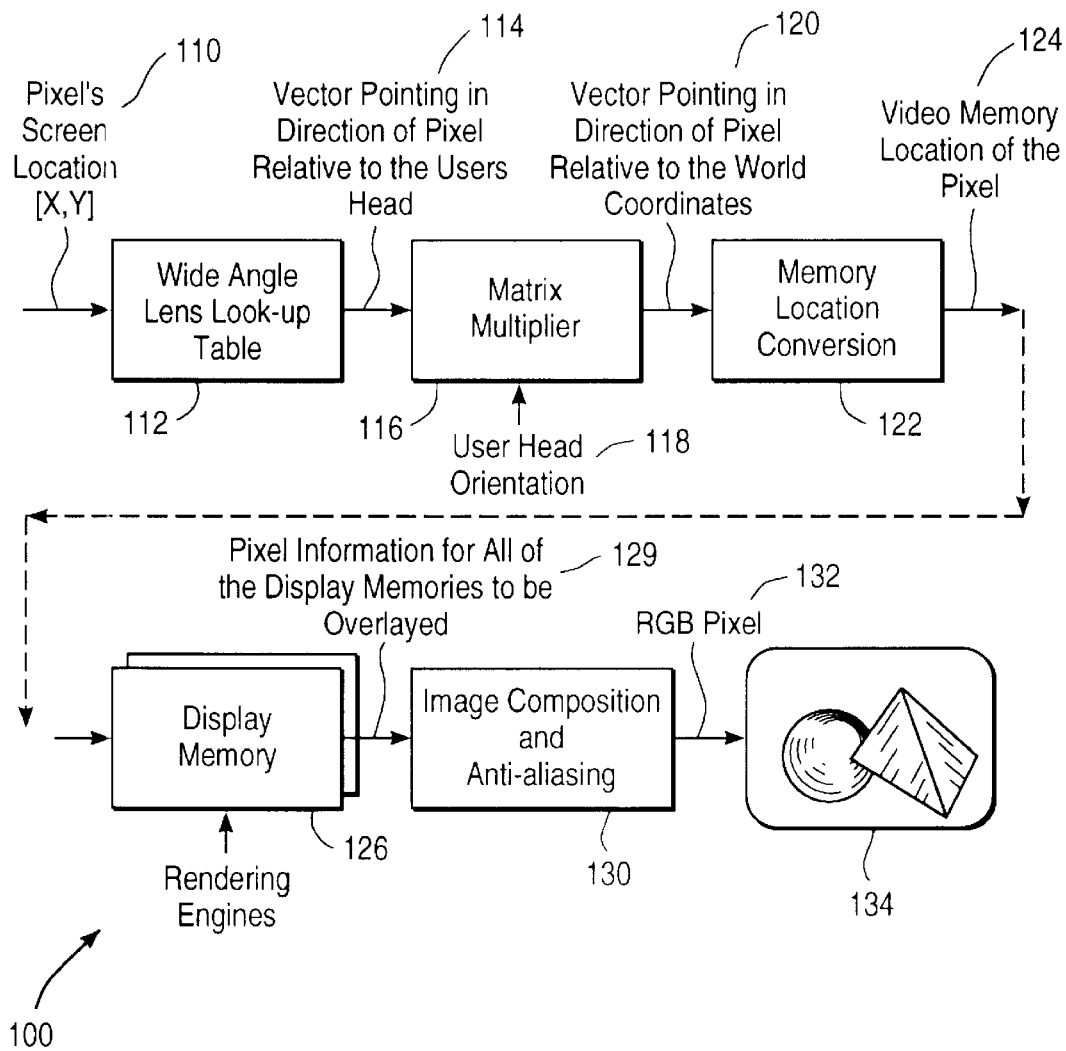
FIG. 8 is a block diagram of one form of the invention, referred to as an address recalculation pipeline.

A block diagram overview of the address recalculation pipeline is shown at 100 in FIG. 8. The pipeline runs at video display rates with the main high speed input 110 being the x-y location of the pixel on the display device. The output 132 from the pipeline is a stream of RGB pixels. The first stage 112 of the pipeline converts the screen location of a pixel from the input 110 into a three dimensional vector 114 pointing in the direction at which the pixel is seen relative to the user's head as seen through the wide angle viewing lenses. The next stage 116 of the pipeline multiplies this vector by a matrix containing user head orientation information received from a head orientation input 118. The output of the matrix multiplication stage 116 is another three dimensional vector 120. This new vector points in the direction at which the pixel is seen relative to the world co-ordinate system. The third stage 122 of the pipeline converts the three dimensional vector 120 into a display memory location 124. Next, four adjacent pixels are fetched from the display memories 126. Finally the four pixel sets are composed and blended at stage 130, using redundant bits from the matrix multiplication stage. The resulting anti-aliased pixel 132 is then sent to one of the output devices 134 in the head mounted displays. The hardware is duplicated to obtain a stereo view.

The X-Y screen location input 110 of the current pixel to be displayed is provided to the pipeline 100 by a conventional graphics controller at a normal pixel display rate. A look-up table called a Wide Angle Viewing Lens Lookup Table is provided at stage 112 to convert the pixel's screen X-Y location into a three dimensional unit Cartesian vector 114 pointing in the direction at which the pixel is seen by the user, through the wide angle lenses, relative to the users head. The look-up table has one entry per display pixel where each entry consists of three 16-bit vector components. For a display device of resolution 640 by 480 pixels the look-up table will require a memory of 1024 (cols)*512 (rows)*6 (bytes per entry)=3 Mbytes. Many head mounted displays use wide angle viewing lenses which preserve a standard viewport mapping, however if a special mapping is required for higher fields of view, the look-up table may be loaded with a new lens mapping, compensating for the lens distortion without run-time penalty. FIGS. 13(a) and (b) show views created from the display memory image in FIG. 6(a) with different wide angle viewing lens mappings.

The 48-bit output of the wide angle viewing lens compensation stage 112 feeds into a matrix multiplier which forms the next stage 116 of the pipeline. The multiplier multiplies the pixel direction vector with a 3 by 3 matrix containing user head orientation information. The resulting output vector 120 points in the direction at which the pixel is seen by the user, through the wide angle viewing lenses, relative to the world co-ordinate system. The pixel direction vector 114 is fed into the matrix multiplier 116 at pixel display rates while the head orientation matrix is updated from the head orientation input 118 at the start of each display frame (i.e. after each vertical sync signal). The matrix multiplier is also implemented with 16-bit fixed point arithmetic and is built with nine commercially available 16-bit by 16-bit, 40 ns multipliers and six 16-bit, 40 ns adders. The output vector 120 from the matrix multiplier 116 is in the form of three 16-bit fixed point vector components [Vx Vy Vz].

Figure 11:
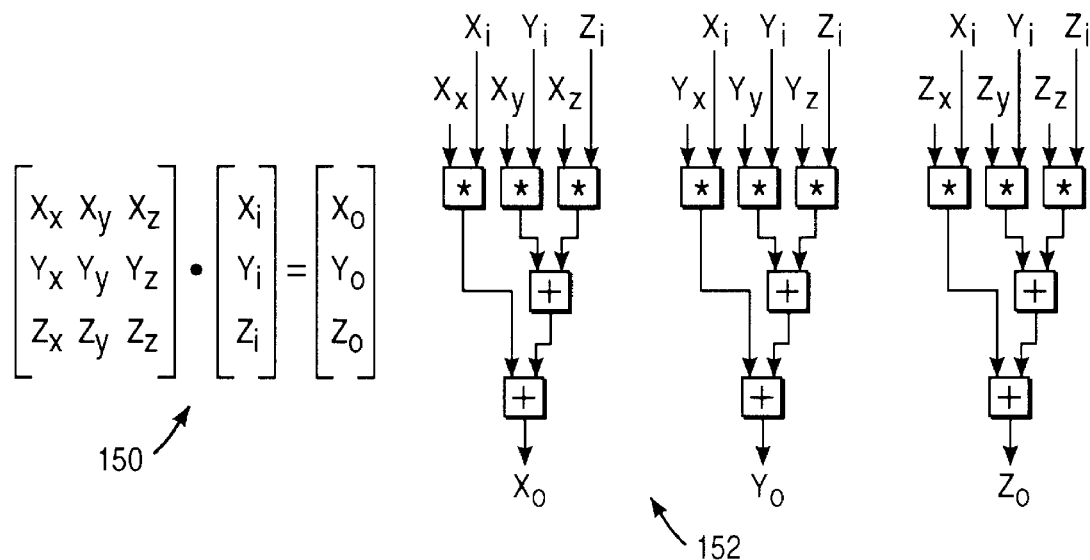
FIG. 11 shows a construction of logical elements for a matrix multiplication stage of the pipeline.

FIG. 11 illustrates the matrix multiplication stage 116 of the pipeline 100. The matrix equation to be solved by the matrix multiplier stage is indicated by reference number 150 in FIG. 11, wherein Xi, Yi and Zi represent the vector 114 of the current pixel location relative tot eh axis of the head mounted display device. The quantities Xx, Xy, Xz, etc. in the 3×3 matrix of equation 150 are quantities input to the matrix multiplier 116 from the head orientation input 118, and represent vectors aligned with the orthogonal axes of the bead mounted display device relative to the axes of the encapsulating surface topology. The hardware implementation for this stage required three multipliers and two adders for each orthogonal axis, and a block diagram of a suitable construction is shown at 152 in FIG. 11. The result of the matrix multiplier 116 is an output vector of the quantities Xo, Yo, Zo which represent a vector in the direction of the current pixel relative to the encapsulating surface axes.

In order to understand how the vector conversion stage 122 of the pipeline operates the topology of the display memory must be known. A requirement of the display memory is that it should completely encapsulate the user's head. The first most apparent solution is to use a spherical encapsulation surface with unit radius where lines of longitude and latitude are mapped to the rows and columns of the display memory. While this approach works it has some drawbacks. In particular, expensive Digital Signal Processing devices are required for vector conversion. Also pixel sizes vary greatly depending upon the pixel's position on the surface of the sphere, resulting in inefficient usage of video memory.

The topology chosen to encapsulate the user's head within this architecture is the surface of a cuboid with side length of two units, centred at the coordinate axes origin. This means the display memory is divided into six faces where each face contains a two dimensional grid of pixels. When folded correctly these faces form a complete surface around the user's head.

A run-time advantage of selecting the surface of a cube over the surface of a sphere is that the scan conversion process for the cube requires minor modifications to existing scan conversion/shading algorithms while scan conversion for the spherical surface requires major, computationally expensive changes to common algorithms.

The conversion process for a cuboid topology involves computing the point at which a ray intersects with the surface of a cube. When the cube is aligned to the axes of the co-ordinate system such that each face of the cube has one of its X, Y or Z co-ordinates fixed at ±1.0, the intersection may be computed with a set of parallel divisions with range checks on the outputs of the divisions. For example, if the result of the divisions Vx/Vy and Vz/Vy are both within the range (−1.0, 1.0) the ray must intersect with only two of the six faces. The sign of Vy is then used to determine the face of intersection. The point of intersection of the face is then (VX/Vy, Vz/Vy). The divisions must occur at pixel display rates, so the divisions are performed by a reciprocal lookup followed by a normal multiply using another set of 40 ns multipliers. The reciprocal lookup has extra output bits which are used to compensate for classification with fixed precision arithmetic. A programmable logic device is used to accumulate data from the appropriate data paths to multiplex the divider outputs to form the display memory address.

Figure 12:
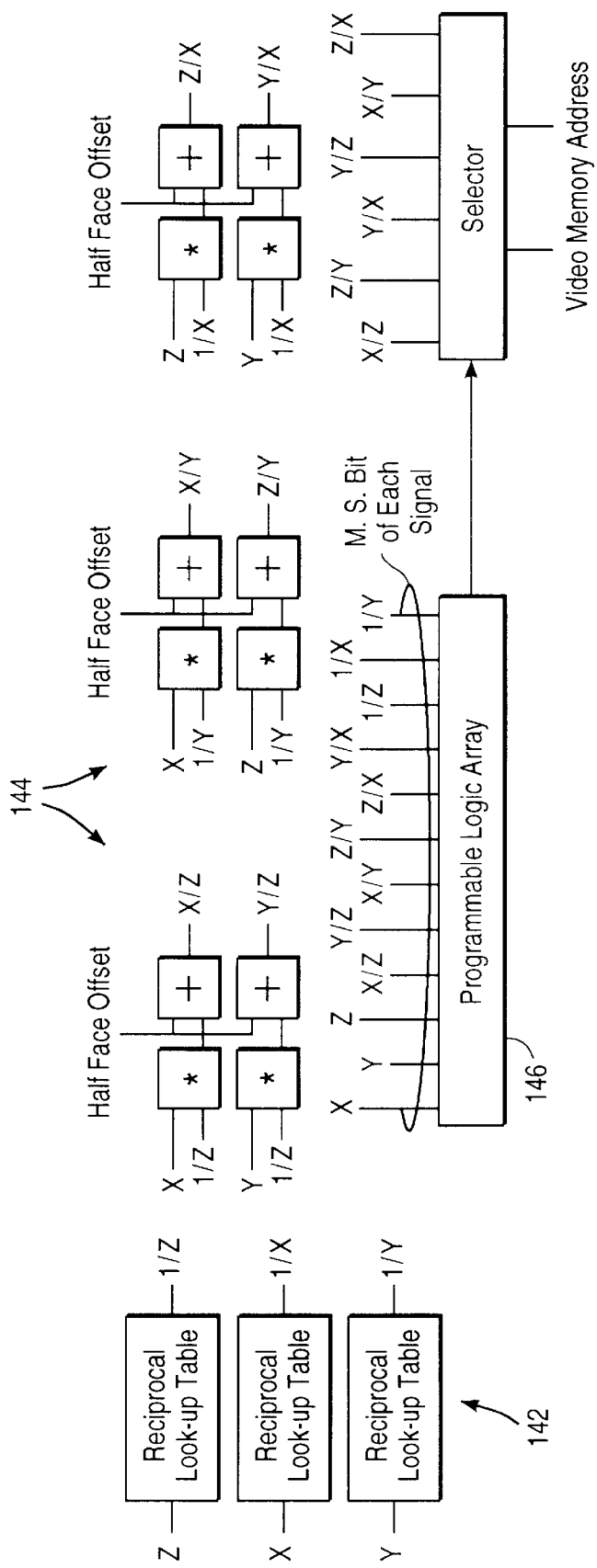
FIG. 12 is a block diagram of a vector conversion stage of the pipeline.

FIG. 12 is a block diagram of one possible form of vector converter 140. Finding dividers which operate at video speeds is quite difficult and the process is further complicated by the fixed point nature of the pipeline. Consequently a table look up followed by a multiplication was the division method chosen for this architecture. Sixteen bit precision inputs/outputs require 128 Kbyte look up tables 142. Using a look-up table means that the range of outputs may be bounded between ±[1.0 and 2.0], simplifying preliminary face classification (a candidate face must have a divisor in the range ±[0.1 to √3]). Adders 144 are used post division to simplify signs for range checking. A programmable logic array 146 is used to classify face intersection from range information from all of the appropriate data paths. Aligned fixed point arithmetic with bounded reciprocal look up tables means that all required range information is stored within the top bit of each data path. The programmable logic array 146 and selector 147 are structured so as to perform the following algorithmic function:

```
if (! ((b15_xdivz^ b13_xdivz) || (b15_ydivz^ b13_ydivz) || out_of_rangez))) {
   get_surrounding_pixels (sdivz, ydivz, (b15_z) ?0:1);
}
else if (!((b15_xdivy^ b13_xidvy) || (b15_zdivy^ b13_zdivy) || out_of_rangey)) {
   get_surrounding_pixels (sdivz, ydivz, (b15_z) ?3:2);
}
else if (!(b15_zdivx^ b13_xdivx) || (b15_ydivx^ b13_ydivx) || out_of_rangex)) {
   get_surrounding_pixels (zdivx, ydivx, (b15_z<0) ?5:4);
}
wherein the function get_surrounding_pixels has the structure
   get_surrounding_pixels (int x, int y, int face)
where int x is the x coordinate of the intersection
   int y is the y coordinate of the intersection
```

-continued and int face is the face of the cuboid surface which contains the intersection point,
and wherein

| b15_z | = bit 15 of z |
| b15_xdivy | = bit 15 of x divided by y |
| b13_sdivy | = bit 13 of x divided by y |
| out_of_rangez | = is out if range to form a reciprocal (ie. $|z| < 0.5$) |

Essentially, the PLA 146 performs the logic of the if statements and the selector 147 performs the operand selection for the operands of the get_surrounding_pixels function.

The current hardware implementation of the address recalculation pipeline uses 16 bit fixed point arithmetic for all computations. The system is designed for medium resolution displays of the order of 640 by 480 pixels with a 60 Hz refresh rate which means each pipeline stage must complete in 40 ns. As mentioned above, the wide angle viewing lens look-up table requires one 48 bit entry per display pixel, and the resulting look-up table is 3 Mbytes in size. The system may accommodate many different wide angle lens types by down loading different distortion mappings into the look-up table. The matrix multiplier stage is implemented with nine 16 bit by 16 bit commercially available multipliers and six 16 bit adders. Some additional 16 bit registers arc used for pipeline synchronisation. The vector conversion stage which converts a three dimensional vector into display memory location requires six 16 bit divisions, some programmable logic and buffering circuitry. The divisions are implemented with a reciprocal table look-up followed by a multiplication.

The vector conversion stage produces a display memory location. The display memory 126 itself is organised into six faces, where the faces logically fold to form a cube. Each face of the cube has a display resolution of 512 by 512 pixels. This display resolution results in 1.5 Mpixel display memories. Each display memory is Z buffered and double buffered with a separate rendering engine. A stereo system employing multiple display memories for image composition requires vast amounts of memory. To implement high resolution display memories with current technology, static memory is used due to the speed requirements and the nonsequential nature of the memory access. As a result, the cost of display memory tends to dominate the cost of the system. This may change as new memory chip architectures become available.

On first examination it may appear that using an address recalculation pipeline would have six times the rendering overheads (scan conversion, clipping etc.) of a conventional system, however this is rarely the case and is only found if the scene has polygons evenly spread out in all three dimensional directions. The address recalculation pipeline must scan convert all polygons it receives which is the worst case scenario for a conventional system. Many conventional rendering systems are designed to cope with situations approaching the worst case scenario. The rendering overheads for a conventional system may be reduced if the user is not looking at a complex part of the scene, however as the system has no control over the user's choice of direction for viewing it is fair to assume the user is looking at the most polygonally dense section of the world.

The pipeline orientates the address generation process within display controller with the orientation of the users head as the pixels are being fetched from video memory. This is the latest stage at which the user's head orientation may be introduced into the view computation within a virtual reality head mounted display system. As user head orientation is not introduced until the pixel is being drawn, the effective computation latency for user head rotations is theoretically reduced to the time it takes one pixel to pass through the address recalculation pipeline. In our simulations however, we have considered the users head to be stationary for an entire display frame. As a result the average latency for head rotations, $L_r$. for each pixel is given in the equation below, assuming the head remains stationary for the duration of the frame.

$$L_r = (F+T)/2 + (C+P)$$

where $L_r$=Average pixel display latency for user head rotations.

F=Time to draw one frame.

T=Time between updates from tracking device.

C=Cost of computing head position.

P=Latency of Address Recalculation Pipeline.

Using a standard raster based display device and a high speed magnetic head tracking device the average rotationally based latency $L_r$ has been found to be in the region of 12 milliseconds and the maximum latency approximately 24 milliseconds.

Figure 9:
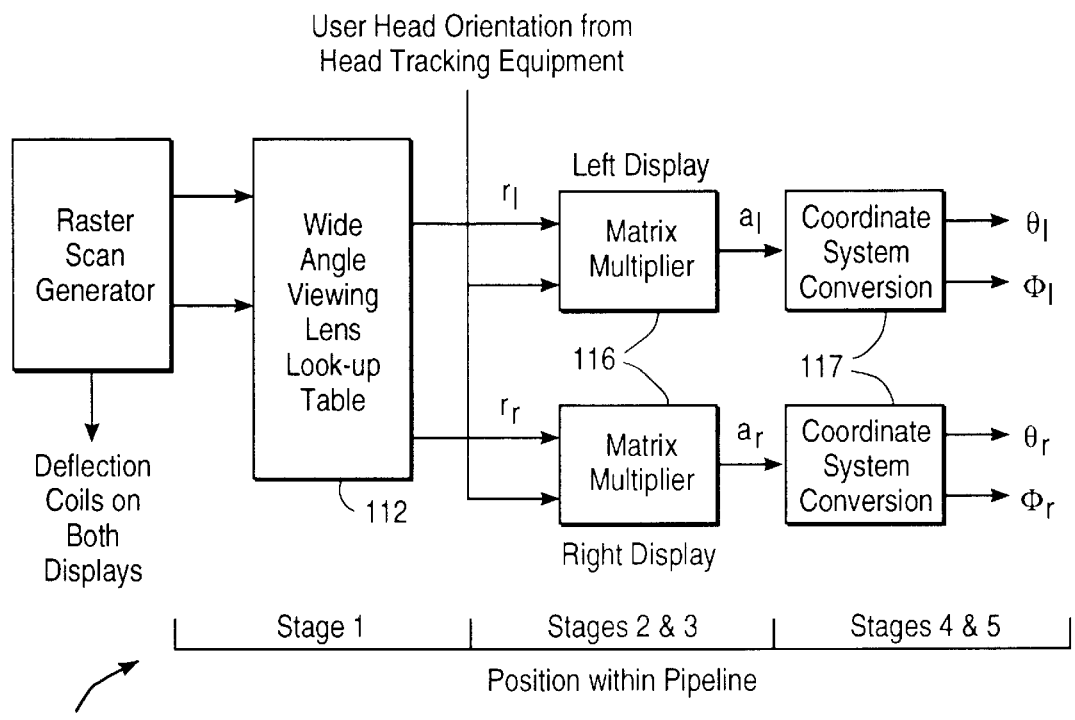
FIGS. 9 and 10 are block diagrams showing additional features of an address recalculation pipeline designed for a spherical encapsulating surface.

FIG. 9 is a block diagram of a portion of an address recalculation pipeline 100 for implementing delayed viewport mapping of an image mapped onto a spherical encapsulating surface, and many of the features described hereinbelow in connection with the spherical mapping pipeline are equally applicable to a cuboid surface topology. A first input to the pipeline intercepts the output of the next_pixel_pointer register containing the screen location of the next pixel to be displayed. The first stage of the pipeline converts this location to a 3D vector pointing in the direction of the pixel as seen by the user within the head mounted display. Typically this stage is a large, high-speed look up table. As the output of this stage is a vector in the direction of the pixel as seen by the user, this vector may be altered to correct for viewing perturbations caused by wide angle viewing lenses. For this reason the first stage of the address re-calculation pipeline is referred to as the Wide Angle Viewing Lens Look Up Table (WAVLLUT).

Stages two and three of the pipeline form a matrix multiplier. One input matrix consists of three orthogonal unit vectors describing the orientation of the user's head relative to world coordinates. This matrix is the second external pipeline input, and is usually updated with the user head position at the start of a display frame. The other input to the matrix multiplier is the current pixel's direction vector output from the previous pipeline stage. The inputs to the multiplier are the pixel direction relative to the user's head and the orientation of the user's head relative to the real world. As such the output of the multiplier is a 3D unit vector describing the pixels direction relative to the world coordinate system. Stage four and five consist of a set of Cartesian to Spherical co-ordinate converters as commonly used within digital signal processing applications. Commercially available converters operate at 25 Mhz.

Figure 10:
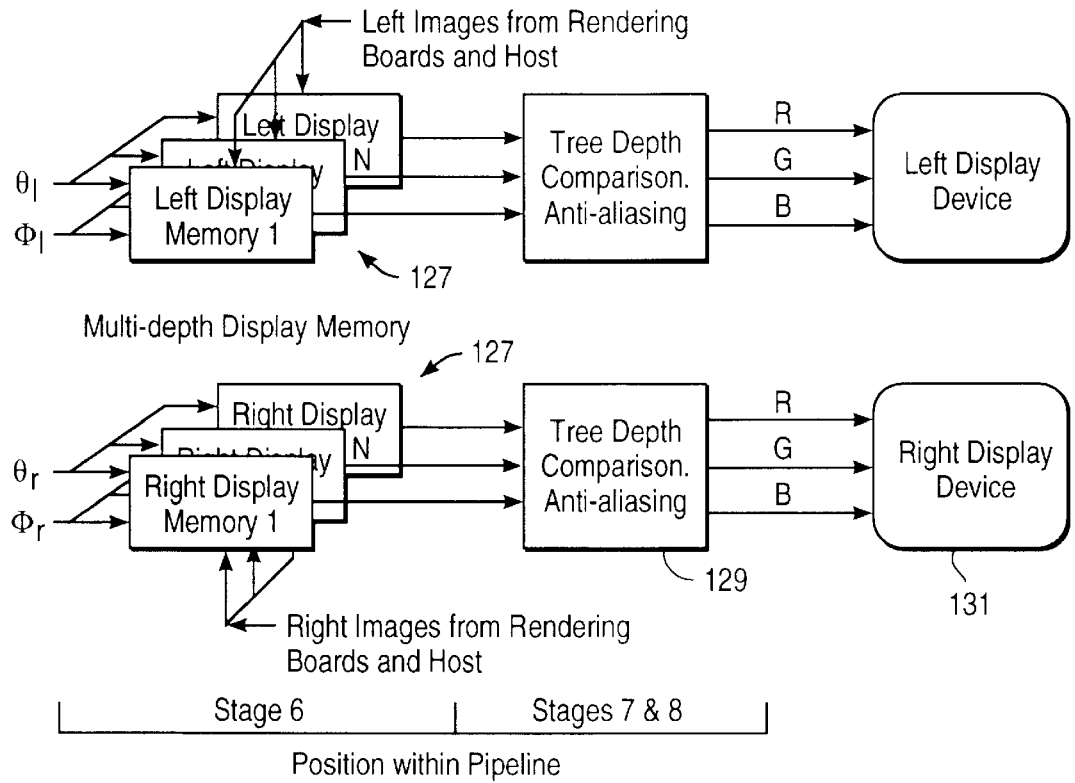

FIG. 10 provides a block diagram overview of the remaining portion of the spherical mapping address recalculation pipeline. The display memory is accessed in stage six of the pipeline where multiple display depths are accessed concurrently. Each display memory depth passes a block of four adjacent RGB pixels to the tree depth comparison stage and anti-aliasing stage.

It is desirable for the address recalculation pipeline to take into account the shape of the lens used for wide angle viewing. Images may cover as much as 140 degrees horizontally and 100 degrees vertically, often without covering the field of view linearly. It may be possible to find a lens mapping that could be encoded in hardware that could compute corrections in real time, however, such hardware systems would be bound to the lenses used and the mapping it provides. Constraining the display hardware to a particular lens is undesirable in terms of flexibility, as most manufacturers of virtual reality head mounted displays tend to use completely different lens systems, providing vastly varying display pixel densities for different eye view positions.

The solution for providing wide angle lens compensation used by forms of the present invention requires a look-up table within the address recalculation pipeline. When the hardware is initialised the optical lens mapping is down loaded into this look-up table. Compensation for visual perturbations caused by wide angle viewing lenses may be expensive to compute when all the corrections are handled by the rendering engine, so storing the pre-computed correction for each pixel within a look-up table means the rendering engine becomes largely independent of the wide angle viewing lenses. Removing this overhead from the rendering engine is an extremely desirable feature.

The wide angle viewing lens look-up table has an entry for each pixel in the display. For a resolution of 640 by 480 pixels, the look-up table requires a nineteen bit address. Each entry consists of two vectors, where a vector has three components of 16 bit accuracy, resulting in each entry being 96 bits or 12 bytes long. As a result the WAVLLUT is built from 6 megabytes of 35 ns static memory.

The matrix multiplier stages consist of two parallel matrix multipliers used to orientate the users head position to the world orientation of the display memory. The precise computation is displayed in FIG. 11, as discussed briefly above. The left hand side 150 of the figure depicts the form of the multiplication while the right hand side shows the hardware implementation 152. The matrix multiplier consists of nine multiplication units and six addition units. The multipliers with operating delays less than the required 40 ns may be purchased reasonable prices. The output of each multiplication unit it latched internally before going into the adder units which form the second stage of the multiplication pipeline.

The unit vector $[Xo\ Yo\ Zo]^T$ on the right hand side the of matrix multiplication 150 is the output of the WAVLLUT. This vector points in the direction at which the pixel is seen by the user relative to the head mounted display. The 3×3 matrix on the left hand side of the multiplication 150 contains three orthogonal unit vectors orientated in the direction of the user's head relative to the world coordinate system and is supplied directly from the user head tracking equipment. Once the orientation matrix is multiplied by the pixel direction vector $[Xi\ Yi\ Zi]^T$ a resulting output vector is produced.

The Cartesian to Spherical coordinate converters 117 (FIG. 9) consist of a set of commercially available digital signal processing devices. These devices accept a Cartesian $[X\ Y\ Z]^T$ vector where each component has 16 bit accuracy and produces a spherical $[R\ \theta\ \phi]^T$ vector where $\theta$ and $\phi$ are each of 12 bit accuracy. These components are then used as row and column addresses for the display memory.

The display memory used in this form of the pipeline emulates a spherical encapsulation surface. It is organised on a latitudinal and longitudinal basis. Depth buffering is implemented by effectively placing one sphere inside another sphere and defining a pixel intensity for which the pixel is to be transparent. Black was chosen to represent a transparent pixel. From this definition, when a pixel on a sphere's surface is black in colour, a pixel which appears directly behind the current pixel is to be displayed. All the pixels behind the current pixel will have the same direction as the current pixel, hence the same memory location. The only difference is that the pixels behind the current pixel will appear within the display memory surfaces representing greater depth. Stage 6 of the pipeline portion illustrated in FIG. 10 contains a plurality of display memories 127 for each of the left and right views. Each display memory is for storage on an image representing a particular layer in the overall image to enable the depth buffering technique to be implemented. Each of the memories in the left and right sides are addressed using the same address coordinates and the accessed pixel values are passed to the depth comparison and anti-aliasing stage 129, where the pixels from the various layers are compared to determine which one is to be passed to the display device 131.

The resolution chosen for a display depth generally involves a trade-off between display memory cost and system performance. The resolution must be sufficient to allow oversampling even within the display regions which have increased pixel densities due to the wide angle viewing lenses. The degree of oversampling is an important factor. As the oversampling ratio is increased the anti-aliasing performance is increased however the display memory cost increases and rendering time increases.

The number of pixels within a display depth is $2n^2$, where n is the number of latitude lines on the surface of the encapsulating sphere. To implement double buffering and Z-buffering rendering techniques, each pixel requires two colour fields and one Z field. With 16-bit colour and 16-bit depths, each pixel requires six bytes of memory. This means the memory requirement per depth per eye is $12n^2$ bytes. If an image contains one thousand and twenty four latitudinal lines, a total of twelve megabytes of 35 ns ram per depth per eye is required. One thousand and twenty four latitudinal lines seems to provide an adequate trade-off between display memory cost and anti-aliasing performance for a 640 by 480 display system.

The display technique described hereinabove is effectively a double sampling technique where the first sampling quantisation occurs when the encapsulating image is generated and the other sampling quantisation occurs when the image to be displayed on the output device is created at pixel display time. A result of this double sampling is noticeable aliasing, that is the occurrence of jagged lines and edge effects (edges of polygons breaking up). Although not critical to system performance, the occurrence of these effects is annoying and as a result some hardware has been designed to reduce the effects of aliasing and edge effects.

A commonly used technique to anti-alias images, especially within ray tracing algorithms, is to drastically oversample the image (say by a factor of 16), then reduce the image to the sampling rate of the display device by applying some form of filter. Extreme oversampling of a pre-rendered scene drastically increased the requirements placed on the display memory and the rendering engine. As a result extreme oversampling is not a practical solution to the aliasing problem within this project.

The second sampling quantisation occurs within the address recalculation pipeline and as such, this quantisation needs to be compensated for within the pipeline. Simulations have shown that slightly oversampling the image then applying a four pixel averaging filter on four adjacent pixels within display memory at pixel display time provides an adequate trade-off between additional hardware complexity and satisfactory anti-aliasing.

The four pixels of each display depth are passed into a tree comparator 129 which compares each of the four pixels independently against the corresponding pixels from other depths to determine which pixels are transparent. Alternatively, a pipelined comparator can be used instead of tree comparator 129, and is in fact preferable for a large scale system. The front-most non-transparent pixels are then piped into the anti-aliasing filter then onto the display device. This technique forms the basis for the anti-aliasing method and apparatus described below.

With respect to the performance of the pipeline architecture, latency to head rotations (except stereoscopy) is fixed to the display rate. This means the eye may track an object as the head rotates with little detectable latency. A display update rate of 60 Hz combined with a head tracking update rate of 120 Hz results in an average rotational latency of approximately 20 ms. Forward prediction of head location using a linear or higher order models may reduce this latency even further. As the viewport mapping process does not have to pass through the double buffer display switching (as it is independent of rendering), the time at which the raster passes through the centre of an image is known precisely. This in turn improves the quality of the head predication process.

Providing a binocular stereoscopic view of the scene may require some objects to be re-rendered. Head rotations cause stereoscopy to diminish at ±90 degrees of the original orientation, however due to the nominal intraocular distance of 6.3 cm for humans, only relatively close objects translate significantly, so image composition allows these object to be re-rendered independently. Added to the fact that the human visual system takes several tens of milliseconds to perceive a stereo scene, and apparently is not sensitive to small temporal errors the latency involved in re-rendering for stereoscopy is important but not critical to system performance.

Latency to translations is often less noticeable than latency to rotation as many translations are the result of a user gesture such as pointing a finger or pushing an accelerator rather than actual physical motion. Providing an adequate update rate for translation however is important to provide a sense of fluid motion. We are currently examining many update models so different objects may be re-rendered to different display memories in order to reduce the overall load on the rendering engine. Most of the update models are generally based on the size, distance and relative velocity of a particular object. Clustering algorithms are being examined to tie objects with a similar update rate to the one display memory.

PRIORITIZED RENDERING

A technique which has been shown to work well in accelerating computer graphics systems is image composition. Instead of treating the scene as a single entity it can be broken down into component objects and combined at the end to produce the scene. These component objects can be rendered separately and, if multiple renderers are available, the rendering process for the components can be performed in parallel. The big gain is that objects which do not change can be left and not rendered again even if other parts of the scene change. Thus a greater than linear speed-up effect can be achieved. Unfortunately this technique has been of little use in virtual reality applications since, as discussed above, a simple rotation causes every object in the image seen by the user to change.

On the other hand, the benefits of image composition can be enjoyed by employing the viewport independent approach for virtual reality applications introduced herein. Since the notional display surface encapsulating the user does not change when the user rotates, the objects already rendered can remain. The Z-values of pixels are used to choose the closest pixel to the user as the one to be displayed. Hence rendered objects are not forced onto particular cubes in relation to their apparent depth, but instead the hardware is allowed to resolve dynamically which pixels to display. Separate rendering engines are provided for each cube. Thus it makes sense to distribute objects over cubes in such a way that those that need to be updated at similar times are grouped together. In this way the rendering capacity is not wasted on redundantly re-rendering objects which have not changed. A technique herein named Prioritized Rendering has been developed to handle display updates efficiently.

The technique of image composition is depicted diagrammatically in FIG. 14. Image composition occurs as pixels are fetched from the display memories to be displayed on the output device. All of the pixels from the display memories which correspond to the same screen location are compared to find the closest pixel, which is then displayed. Each stored pixel value has a plurality of colour components (such as a red, a green and a blue component) and may also be stored with an additional component which indicates the "distance" to the pixel within the context of the scene in which it is included. The distance component of the stored pixel valve is referred to as a E-value, and is sometimes used in conventional graphic display systems to perform hidden face removal and clipping.

For example if a near polygon is drawn into the display memory the z-value of each pixel will be low. If another polygon is to be drawn which cuts through the original polygon, as each of the pixels are drawn, the z-values of the new polygon are compared with the z-values in the display memory and if the new pixel is closer (ie. has a smaller z) the pixel from second polygon is drawn into the memory (including z-value) otherwise the pixel from the original polygon remains. Therefore, once a polygon has been drawn it may be forgotten.

When image composition is to be used, there are multiple overlapping display memories which contain a part of the scene. This means that when the data is read from the memory to be displayed instead of one stream of pixels there are multiple streams of pixels. It therefore becomes necessary to decide which of the stream to choose to display. This is done on a pixel-by-pixel basis by comparing the pixel with the lowest z component. As a result the comparison of z values must occur at pixel display rates.

Objects in the virtual world will appear to change at different rates. The apparent movement of the object due to a rotation of the user is handled automatically by the address recalculation pipeline which implements delayed viewport mapping. Other changes in the way the object is perceived are due to the object's own animation and due to translational movement of the user in the virtual world. It is possible to classify further kinds of changes in the appearance of the object into those involving its displayed size and those involving its displayed position. Objects should appear larger when the user is closer to them and smaller when farther away. Relative side-to-side movement will cause an apparent change in the position in which the object is displayed. Of course any animation of the object itself can lead to both these effects. The effects of user translation can be quantified using simple geometric analysis. Using this approach it is possible to calculate the amount of time for which the current displayed image of the object will remain valid, and hence determine the required rate of update of the object's displayed image.

Prioritized rendering takes advantage of the fact that not all objects need to be updated at the same rate. By sorting the objects into a priority order based on their required update rates, the most important changes in object appearance can be rendered first, thus guaranteeing that if perchance there is insufficient rendering capacity the best possible result has been achieved. Even in such an unfortunate case the latency of response to head orientation changes is not affected since that is handled by the address recalculation pipeline.

This however is not the main advantage of prioritized rendering. Its most dramatic property is that the overall rendering required is reduced significantly. It can be shown that an order of magnitude reduction in required rendering is not unreasonable due to this approach. This occurs because the average required update rate for all objects in the virtual world is much less than the display update rate. By balancing the rendering load among multiple renderers updating multiple display memories at various update rates and composing the final image for display, the combination of prioritized rendering, image composition, and the delayed viewport mapping provided by the address recalculation pipeline can outperform conventional virtual reality implementations.

In employing the image overlaying or image composition technique, multiple display memories are required rather than just one display memory (or two for double buffering). Different sections of the visible scene may be drawn into separate display memories then overlayed to form a final scene. In many implementations each display memory has a private rendering engine.

As pixels are being fetched from the display memory to be sent to the output device, all the display memories are simultaneously fetched from the same location. Next the Z value associated with each pixel is compared with the Z value of the pixels from the same location in the other display memories. The pixel with the smallest Z value is sent to the output device.

In a conventional graphics system image composition uses a factor n redundancy to provide a factor n increase in performance. A side effect of image composition is that each of the display memories may be updated individually and at different rates. In a virtual reality system using image composition alone this side effect is generally of no use as all of the images in the display memories are rendered with the same fixed viewport mapping so when the viewport changes due to a user head rotation all of the images have an incorrect viewport mapping and need re-rendering. A factor n increase in speed is all that may be achieved.

Using an address recalculation pipeline it is possible to make effect use of this side effect of image composition to achieve in certain cases much better than factor n improvement for n display memories in a virtual reality display environment. This is because the images in the display memory of a graphics system with an address recalculation pipeline do not necessarily become invalid when the user's head orientation changes, thus the length of time an image in display memory is valid only loosely depends on the orientation (for a stereo view). For example a non interactive background may never require re-rendering and may thus be pre-rendered with greater detail using a high quality rendering technique and a complex model.

Using an address recalculation pipeline it is possible to render a scene which is largely independent of the user's head orientation. When image composition is combined with the address recalculation pipeline it is possible to render different parts of a scene at different rates.

The orientation independent sections of a static scene that change the most tend to occur during user translations. When the user is stationary within the scene, the renderers must only maintain stereoscopy (which is a form of translation) and animate objects which are changing themselves or change as a result of interaction.

Priority rendering is demand driven rendering. An object is not redrawn until its image within the display memory has changed by a predetermined threshold. In a conventional system this strategy would not be effective as almost any head rotations would cause considerable changes to the image in display memory and the system would have to re-render everything. The images stored in the display memory of a graphics system with an address recalculation pipeline are to a great extent independent of user head orientation which means the renderer doesn't have to redraw the entire scene for bead rotations.

The threshold for determining when an object has changed by more than a tolerable amount is determined by the designer of the virtual world and may typically be based on several factors. Usually this threshold is in the form of an angle ($\theta_1$) which defines the minimum feature size of the world. Ideally this angle would be less than the minimum feature size the human eye can detect, approximately one third of an arc minute, however in reality this is impractical. If anti-aliasing of the image in display memory is not used a more sensible threshold may be the inter-pixel spacing in the display memory and if no hardware anti-aliasing is used at all, the pixel spacing in the bead set worn by the user may be used. Priority rendering attempts to keep the image in display memory accurate to within ($\theta_1$) at the highest possible update rate.

In order to compute the image changes for an object contained within the virtual world we compute how much the object would have changed if it were static and then add an animation component unique to the object as required.

Consider what happens to the display memory image of a static object as the user translates relative to the object. The relative location of the image changes and the image itself may change in size. The rendering strategy must compensate for image changes within display memory. It is possible to predict when these changes occur by observing certain features of a sphere which encapsulates the object.

User translations cause objects to move within the display memory. In order to keep the scene accurate to within $\theta_1$ we need to know how long the image of the object will remain valid at the user's current relative speed. This time is known as the object's translational validity period ($\tau_{translation}$). Relative speed is used to compute the object's validity period rather than relative velocity as the resulting world would have several objects caught in slow display memories if the user changes direction significantly. This would result in large temporal errors in the locations of several objects. The relative speed must include a component for the eyes' speed relative to the centre of rotation of the head if the users head is rotating. FIG. 15 illustrates how the translational validity period $\tau_{translation}$ is calculated for a particular object, i. In effect, the translational validity period is the time period required for the centre of the object to trace an angle $\theta_i$ across the image presented to the user, and can be calculated according to:

$$\tau_{translation}(i) = \frac{distance(i) * \sqrt{(2*(1 - \cos(\theta_i)))}}{relative\_speed(i)}$$

where distance (i) is the computed distance between the object, i, and the user; and relative-speed (i) is the computed relative speed as between the object and the user.

As the user moves towards or away from an object the size of the image of the object changes. We must compute the time that the size of the object is valid and re-render the object when its image size has changed by the predetermined threshold $\theta_i$. Again we use the speed of the object relative to the user for our computations for the same reasons as before. The period for which the size of the image is valid is know as the object'size validity time ($\tau_{size}$). FIG. 16 illustrates hoe the size validity time $\tau_{size}$ is calculated for a particular object, i. In effect, the size validity time is the time period required for the perceived angular distance between the centre and outer periphery of the object to diminish by an angular amount of $\theta_i$. As shown in FIG. 16, the size validity period can be calculated according to:

$$\tau_{size}(i) = \frac{distance(i) - radius(i)/\sin(\theta_t + A\sin(radium(i)/distance(i)))}{relative\_speed(i)}$$

where radius (i) is the computed distance between the centre of object i and the outer periphery thereof. Note that as the image size change by $\theta_i$ there may be several aliases of the object; these have been ignored.

The last factor we consider is any requirement of animation by the object itself. For example a bird flapping its wings requires more updating than a static object like a stationary rock. The period of update for a specific object must be tagged to the object within the database and is defined by the virtual world designer. The period of the current frame of animation for a particular object is known as the object's animation validity time.

$$\tau_{animation} = \text{user\_defined}$$

Many other factors may be considered relevant for a highly accurate representation of the scene. For example, object rotation corresponding to user translation is because either size, translational or animation changes tend to dominate the required update rate.

Finally it is possible to determine the overall object validity period. This period indicates the amount of time available until the next update of the object is required. This period also indicates the latency for a particular object, however, by definition the error in position of the object is less than $\theta_t$. The overall object validity period $\tau_{overall}$ is defined as the smallest of the translational, size and animation periods. Obviously if $\tau_{overall}$ is less than the period of maximum update rate, $\tau_{overall}$ is assigned the period of the maximum frame rate. This period defines the object's priority (ie: smaller period means higher priority) and the rendering power devoted to a particular object is based on this priority.

$$\tau_{overall} = \min(\tau_{translation}, \tau_{size}, \tau_{animation})$$

Accelerations have not be considered thus far, only relative speed. This may result in latency when accelerating as an object's computed validity period may not accurately reflect the actual validity period. Including acceleration into period computations is possible however the computation is made unnecessarily complex as high accelerations within a virtual world are limited as the sense of heavy acceleration may result in a form of motion sickness known as vection.

The previous discussions are based on being able to render all objects completely independently, this would require a pair of display memories per object (for a stereo view). As display memory pricing tends to dominate the overall system cost, providing one display memory per object is obviously impractical. An alternative is to have a limited number of display memories with fixed update periods and attempt to match highest update period which is less than the validity period of the object is chosen as the target display memory for a particular object.

Several strategies for dividing the overall system into a set of display memory update rates are possible and the optimal technique will ultimately depend on the nature of the virtual world. For prototype implementations of the priority rendering a set of update rates starting at the highest swap rate (for example 60 Hz) were chosen. All other swap rates are some exponential harmonic of the top rate. The display memory update swap strategy is depicted in FIG. 17 which shows the update sequence for four memory layers (memory 0 to memory 3). The memory which is updated most often (memory o) should contain the objects with the smallest overall validity period, whilst the memory updated least often (memory 3) should contain objects with the largest overall validity period. As can be seen from FIG. 17, memory o is updated twice as often as memory 1; memory 1 is updated twice as often as memory 2; and memory 2 is updated twice as often as memory 3. Using this technique it is also possible to swap an object from a low update rate into any of the higher update rates, or vice versa, if required.

The fastest display memory updates at 60 frames per second and all of the other display memories update at some exponential harmonic of the top rate. The main reason for basing the updating rates on harmonics is so objects may be swapped from a slow update rate to a faster update rate, if required, by swapping from one display memory to another. The promotion or demotion of an object from one update rate to another occurs on the crossing of the harmonics, since if objects are not swapped on harmonic crossings an object may not be represented, or represented twice, for a short period of time. This choice of exponential harmonics may not lead to maximum rendering efficiency (the number of times the object needs to be updated compared with the number of times the object is updated) and rendering loads across all display memories may not be distributed evenly. However the optimal configuration is based heavily on the nature of the virtual scene, the rendering power available and the desired overload strategy.

The rendering hardware may have more display memories available than the virtual world requires for high efficiency. In this event, multiple renderers and display memories may be assigned to the one update rate thus devoting more hardware resources to a particular update rate, helping to balance the load.

The previous computations do not take into account stereoscopy. Fortunately the closest objects are most likely to be in high speed buffers and it is these objects that are most affected by stereo updates. It may be possible to include a period factor which considers how far the head may rotate within a set period of time, however this is deemed unnecessary as some latency to stereoscopy is available.

Priority rendering may be used to reduce the overall rendering load on the rendering subsystem. The rendering load is based on several features of the scene, where the actual number of polygons is just one of the factors. One virtual world application which has been investigated is a wal through of a forest, and is the subject of the discussion below. This simulation was performed in order to determine the rendering load on various display memories with various update rates.

The virtual world under investigation contained one thousand trees, each tree bounded by a sphere of radius five meters which implies a maximum tree height of ten meters. The actual number of polygons contained within each tree is arbitrary as only the object rendering load is considered, the number of polygons per tree eventually being determined by the real rendering power. The trees are randomly placed in a circular forest at a density such that the leaves of the trees may form a continuous canopy. The resulting forest has a radius of one hundred and fifty meters.

The simulation investigates the object rendering loads on various display memories with different update rates. The simulation is conducted as a walk through the world from one side to the other at one meter per second (approximate walking speed), passing through the centre of the virtual world. This enables statistics on rendering loads to be determined for circumstances ranging from being completely surrounded by the objects to being at the edge of the objects. The chosen allowable error $\theta_r$ was the smallest inter-pixel spacing between he smallest pixels in the display memory. For a system with a display memory resolution of 512 by 512 pixels per face, this means the smallest distance between any two pixels is approximately six arc minutes. This is an order of magnitude higher than the resolution of the human eye.

All of the comparisons are based on the number of objects that must be redrawn by the rendering system to maintain approximately the same illusion with an effective update rate of 60 frames per second. A comparison is made of the number of objects a system with an address recalculation pipeline must redraw against the number of objects a system without the pipeline must redraw for the entire length of the simulation (both systems are assumed to have multiple display memories and multiple renders). The Relative Object Rendering Load (RORL) is a percentage measurement of this ratio.

$$RORL = \frac{\text{Total number of object updates (with pipline)}}{\text{Total number of object updates (without pipeline)}} * 100\%$$

With an address recalculation pipeline for the simulation described above the RORL was determined to be 15%. That is the system with the pipeline only had to redraw 15 objects for every 100 objects the system without the pipeline had to redraw for a similar illusion. If the minimum feature size (maximum error size) $\theta_r$ is made larger, the RORL reduces further. When $\theta_r$ is increased to be the smallest arc distance between the largest pixels in display memory the RORL is less than 8% of the object rendering load of a conventional system. FIG. 18 depicts a graphical representation of the relationship between the object rendering load (relative to a conventional system) and minimum feature size.

As can be ascertained from the above, the combination of the address recalculation pipeline with image composition and priority rendering can reduce the total object rendering load to 15% of the equivalent object rendering load without the new hardware. The main reason for this significant saving is depicted in FIG. 19. Of the total number of object updates required for the walk through, nearly 40% of them were assigned to display memory 3 which is swapping at 7.5 frames per second. So even though display memory 0 is swapping 8 times faster than display memory 3, it is only doing one quarter the work display memory 3 is doing. This means memory 3 is updating (40%/10%*8)=32 times the number of objects display memory 0 is updating (at an eight the rate).

Providing a stereo view of the world is highly desirable within a head mounted graphics display system to help with the sense of presence within the virtual world. With an address recalculation pipeline the display memories are not actually centred around the point of rotation of the user's head, rather they are centred around the user's eyes. This means when the user's head rotates while the user is stationary a small amount of translation occurs. This implied the need to re-render some objects which are affected by the translation caused by the head rotation. Although the speed at which the eyes translate during a head rotation must be included into the priority computation for $\tau_{translation}$ and $\tau_{size}$ it is interesting to note the total number of objects that become invalid to head rotations of various angles. FIG. 20 shows a graphically represented example of how many objects become invalid for a particular head rotation. The upper line 160 is for $\theta_r$=6 arc minutes (corresponding to the smallest pixel in the display memory) while the lower line 162 is for $\theta_r$=13 arc minutes (corresponding to the largest pixel in display memory). From this graph we see that head rotations smaller than 45 degrees require few objects to be updated. The graph of FIG. 20 was generated using data obtained whilst situated in the middle of the above mentioned virtual scene.

Translations within a virtual world are animated, hence the rendering engine is involved in the process. To allow translational freedom a powerful rendering engine is required. A series of Intel i860 microprocessors, for example, are considered suitable for rendering. Each depth for each eye can be allocated an i860 to write an image into the display memory. Three depths are to be implemented for each eye resulting in a total of six i860s within the rendering engine.

In practice, a high performance, multiprocessor host computer will generate the scene to be displayed by generating all of the required polygons to describe the scene, acting as a polygon server. The i860s then scan convert the polygons. Using this form of hardware it is possible for the display memory to be double buffered with two 16 bit colour fields and a 16 bit Z-buffer field for each pixel. One way in which the prioritized rendering method can be implemented is to provide a software function in the host computer which stores, along with the polygon structural information, an indication of the priority of the polygon based on the overall validity period for the object containing the polygon. It is then a relatively simple matter to provide the software for the i860 based rendering engines with functions for selecting only polygons with an appropriate stored priority value to generate image data for the various display memories. The software for the polygon server host computer can be synchronised with the update periods of the rendering engines so that the priority value for a polygon is only altered by the host computer at a harmonic crossing for the update periods, as discussed hereinabove.

It is envisaged that an otherwise conventional polygon server host computer and rendering engines can be utilised to carry out the invention, and these functions will not be described in detail herein.

DISPLAY MEMORY ACCESSING AND ANTI-ALIASING

The address recalculation pipeline performs a remapping of the image in display memory to form an output image in real time based on the wide angle viewing lenses and the user head orientation. This remapping is performed one pixel at a time by the hardware in the address recalculation pipeline. The remapping occurs by sampling the image contained within the display memory an d as with any form of discrete sampling, aliasing occurs. Even if the image in the display memory is anti-aliased and rendered with a high quality rendering technique, the hardware sampling occurring will cause aliasing in the final image. The aliases introduced by the address recalculation pipeline cannot be corrected with software in the rendering process. Any pipeline anti-aliasing must occur in the hardware.

Providing no hardware anti-aliasing is always an option and in fact simplifies the hardware significantly, although the display image quality can suffer quite severely. For example, images become sensitive to noise from the head tracker. When the intersection computation from the pipeline for a given pixel in display memory is close to the pixel's area boundary, a very small change in the tracked position of the users head caused by tracker noise could cause the output pixel to flicker between adjacent display memory pixels. The flickering will be most noticeable at the boundaries of polygons and on straight lines. Even stationary objects will have noticeable artifacts. Straight lines appear broken and the stair-casing of angle lines become significant.

The anti-aliasing strategy chose for the present display architecture is a linear interpolation filter using redundant addressing bits from the intersection computation. With the current architecture 4 bits in each direction are used for the interpolation filter (see FIG. 21). A linear interpolation filter provides an adequate trade-off between system expense and filter quality.

In order to perform linear interpolation the four pixels surrounding the point of intersection must be fetched simultaneously. The interleaving mechanism for fetching the four adjacent pixels is discussed later.

Referring to FIG. 21, intersection point 200 indicates the result of the intersection computation from the pipeline representing the point of intersection of the vector 120 (see FIG. 8) with the encapsulating display surface. As can be seen from the drawing, the intersection point 200 is not aligned precisely with any one individual pixel from the encapsulating surface display memory, but is disposed between four adjacent pixels 202, 204, 206 and 208 (pixel 1, pixel 2, pixel 3 and pixel 4). The linear interpolation filter used herein for anti-aliasing in effect takes a weighted average of the color intensities of the adjacent pixels 202, 204, 206 and 208 on the basis of the distance from the intersection point 200 to each of the adjacent display memory pixels. The three color streams of the four adjacent pixels 202, 204, 206, 208 are separated and managed independently. The four adjacent pixels are paired off such that the two Y values are the same. That is pixel 1 (202) is paired with pixel 2 (204) and pixel 3 (206) is paired with Pixel 4 (208). Within each pair of pixels, the color component of the first pixel (202 or 206) is concatenated with the second pixel (204 or 208) color value which is then concatenated with the (x) redundant bits from the intersection computation. These for two addresses into two independent lookup tables which contains interpolated data corresponding to the color values for the individual pixels of each pair and the relative positioning of the intersection point with respect to the pixels of each pair along the x-axis. The output of the lookup tables corresponds to intermediate pixels 210, 212 which are the color interpolation of the two pixel pairs. The intermediate pixel values are concatenated with each other and the (y) redundant bits from the intersection computation, to form an address into another lookup table which interpolates along the y-axis direction. The output of this table is the final color interpolated value of the four adjacent pixels 202, 204, 206, 208.

FIG. 22 depicts a block diagram of the hardware structure for a linear interpolation filter 220 which operates as discussed above. The filter 220 illustrated represents only a single color value (red) of the three color values used for each pixel. The interpolation of the pixel color values along the x-axis direction is performed by look-up tables 222 and 224 which each receive as inputs the color values for the respective adjacent pixels and a four bit positioning address which represents positioning of the intersection point 200 along the x-axis between the adjacent pixels. For example, the look-up table may be structured such that if the four bit positioning address is 0000, the output value from table 222 is the same as the color value for pixel 1. This would correspond to the case where the intersection point 200 is aligned with pixel 1 and pixel 3 (202, 206) in the x-direction. Similarly, if the positioning address has a 1111 value, the output from table 222 may be the same as the color value for pixel 3. Where the positioning address is an intermediate value, the look-up table can be structured so as to return a value corresponding to, for example:

$$\text{Output} = \frac{(\text{input } x * \text{input } 1 + (15 - \text{input } x) * \text{input } 2)}{2}$$

where
  input 1 is the color value for pixel 1 (table 222);
  input 2 is the color value for pixel 2;
  input x is the 4 bit positioning address; and
  output is the value stored in look-up table 222 corresponding to the address formed by concatenating input 1, input 2, input x.

A similar procedure is then carried out by the look-up table 226 using the outputs from tables 222 and 224 as inputs, as well as a four bit y-axis positioning address. The four bit positioning addresses used as inputs to the look-up tables 222, 224 and 226 of the interpolation filter 220 can be obtained from the four least significant bits of the x and y components of the vector 120 generated by the matrix multiplier 116 of the pipeline 100 (see FIG. 8).

The number of bits per pixel color component obviously has a great influence on the size of the look-up tables. When pixels in display memory are stored in a 24-bit color format, each of the three look-up tables for one color stream is 1 Mbyte. The overall anti-aliasing strategy requires 9 Mbytes. As the pixel interpolation occurs after image composition this figure of 9 Mbytes is independent of the number of display memories. While this figure may seem high for an anti-aliasing strategy, a complete system with six display memories would have over 160 Mbytes of display memory and an extra 9 Mbytes is easily justified. When 16 bits per pixel are used for color instead of 24 bits, the overall anti-aliasing strategy requires a little over half a megabyte. The intermediate pixel values are registered hence forming another pipeline stage. The anti-alias look-up table should also be static memory operating at video display rates since it forms part of the pipeline.

The display memory in the address recalculation pipeline system is generally one of the most expensive components in the system, so the organization of the memory is important, moreover any inefficiencies are multiplied by the use of image composition.

Conventional graphics systems generally use low cost dynamic RAM in a fast page mode or video RAM which has internal shift registers to achieve the high output bandwidth required by raster display systems. The high output bandwidth is achieved in both cases as an artifact of the sequential nature of the display memory accesses. Pixel addresses created by an address recalculation pipeline are not sequential and while there may be some locality in consecutive pixel addresses, these addresses are considered to be random. The display memory must be able to perform random accesses at raster display rates. This means that with current technology the display memory has to be implemented with expensive high speed static RAM. Interleaving of the video memory cannot be used to increase the effective video memory access rate which means the random access time of the static ram must be less than the pixel display period, hence making the display memory quite expensive.

The display memory is organized into 6 faces for a cuboid encapsulating surface, where each face has a given resolution. The face resolution for a prototype system was chosen to be 512 by 512 pixels. The faces are illustrated and arbitrarily labelled Face 0 to Face 5 in FIG. 23.

In order to perform a linear interpolation anti-aliasing strategy, adjacent pixels within display memory must be accessed simultaneously. The access mechanism used in the prototype system begins by first dividing the display memory into 6 independently addressable segments and then arranging them in such a manner that with appropriate logic, four of the six addressed memory accesses retrieve are the required adjacent pixels. The independently addressable segments are labelled A, B, C, D, E and F. The address range of the segments are grouped but different sections of the address range of each segment are grouped differently, for example the address bits 0–7 of segment A are grouped differently to bits 8–17 of segment A. Note that the addressing figures given are for the prototype system with a face resolution of 512 by 512 pixels. The exact groupings are shown in FIG. 23.

Face intersection computations from the address recalculation pipeline give a 3-bit face number f, and two 9-bit face co-ordinates, i and j. Lets first consider the i face co-ordinate. We arrange the memory such that for a given address the pixel in segment A is always to the left of the pixel in segment B. The same is also true for segments CD and EF. For a given intersection, if the required order is AB, segments A and B may be accessed with the same addresses, however if the required order is BA, segment A must access the pixel one location further into the memory than segment B. The required order AB or BA is given by the least significant bit of i. The display memory lines are 512 pixels wide which means there must be 256 AB pixel pairs. Thus A and B line position co-ordinates must be 8 bits wide. For any i, the B pixel low order address bits are computed by shifting i right by 1 bit i.e. B(0–7)=i>>1. The A pixel low order addresses are computed by adding one to i then shifting the result right 1 bit i.e. A(0–7)=(i+1)>>1. As A must also be adjacent to C or E. The low order bits of A, C and E are grouped, and the low order bits of B, D and F are grouped.

$$A(0{-}7)=C(0{-}7)=E(0{-}7)$$

$$B(0{-}7)=D(0{-}7)=F(0{-}7)$$

The high order bits of A and B are grouped A(8–17)=B (8–17), as are the high order bits of C and D as well as E and F. Lines of AB may occur in faces 0, 1, 4 and 5. In faces 4 and 5 the lines of AB occur in odd rows, while in faces 0 and 1 the lines are in even positions. The address bits 8 to 15 of AB may be computed from j, while bits 16 and 17 are computed from F. For odd line positions the address bits 8 to 15 are simply j shifted right one position. When the lines are in even positions the addresses are formed by adding one to j then shifting the result right by one bit. More precisely:

$$AB(8{-}15)=j\!>>\!1$$

if face=4 or 5;

$$AB(8{-}15)=(j+1)\!>>\!1$$

if face=0 or 1;
Similarly the faces of CD and EF are grouped.

$$CD(8{-}15)=j\!>>\!1$$

if face=0 or 1;

$$CD(8{-}15)=(j+1)\!>>\!1$$

if face=2 or 3;

$$EF(8{-}15)=j\!>>\!1$$

if face=2 or 3;

$$EF(8{-}15)=(j+1)\!>>\!1$$

if face=4 or 5.

As stated the two highest order bits of AB, CD and EF (bits 16 and 17) are computed from the face number directly.

The memory accessing function for retrieving memory values for adjacent pixels can be succinctly described in connection with a simplified example using only two adjacent pixels. Say the display memory is organised so that even location pixels in a raster scan line are stored in chip A and location pixels stored in chip B. Thus a row of pixels would have display memory addresses which alternative between chips A and B for adjacent pixels, ABABABABA-BABAB . . . etc. Assuming that the row is 512 pixels wide (ie. 9-bits of address) means that there are 256 A pixels and 256 B pixels, hence the addressing of the A and B chips is only 8 bits. A pixel in B at a particular address is positioned to the right of the pixel in A at the same address.

So, if we know the location of where we want the adjacent pixels to 13-bits (from the vector intersection calculation) say 0011010110110, we truncate the top 8 bits to address B ie 00110101, and this is the location of one of the adjacent pixels. The other pixel is in A and is found by rounding to 8 bits, ie at location 001101110, (need to add 1 to the top 8 bits). The lower 4-bits then tell us the relative location between the two pixels and allows us to interpolate the pixel values as discussed above.

If we have had location 0011010100110 we would use the top 8 bits for A and B, without any additions.

The additions required to access adjacent pixels form yet another stage of the address recalculation pipeline and the actual adders are located on the display memory boards. The additions required for adjacent access and the address multiplexing required for double buffering are implemented with a set of four Erasable Programmable Logic Devices (EPLD) per render board. An overview of the EPLD is given in FIG. 24. FIG. 25 shows how the EPLDs are arranged to form two sets of addresses (for double buffering). This architecture allows six pixels to be addressed simultaneously where four of the six pixels are adjacent.

At the start of each display memory swap the renderer must clear all the RGB and Z components of each pixel in the display memory. As well as being able to read six pixels simultaneously the EPLD may write to six pixels simultaneously. When clearing the display memory contents after a double buffer swap the scan converter may write the same initialization values to six pixels at one time. As a result the display memory clear time is reduced by a factor of six.

SUMMARY

Mechanisms have been described which enable the efficient implementation of virtual reality applications without the serious tradeoff between latency and image resolution which has plagued most existing systems. What tended to suffer was frame rate, and hence latency, when the computer system could not keep up with the processing load. In such systems the frame rate would drop as the changes to the scene increased. More sophisticated systems would drop the accuracy of the virtual world model to minimize changes which require re-rendering. Other systems would reduce the accuracy of their rendering to try to maintain a minimum frame rate. All such systems degrade rapidly when stressed by change in the view of the virtual environment.

In the present system latency to rotation is independent of the virtual world; it is a function of hardware and is effectively limited by the tracking equipment. Translational latency is reduced indirectly in that distant objects in the background will not be observed to move and need not be re-rendered. Changes in the environment itself must still be handled, but by grouping the changes according to their observed speeds it is possible to minimize the number of display surfaces which need to be updated. In the same way changes due to translations and due to preserving stereoscopy can be grouped according to the required update rates and allocated to the display memories appropriately.

Although embodiments of the present invention present a solution to the extremely important and difficult case of rotational latency, translations and actual virtual environmental changes can conceivably overload the system. The important thing to note is that such problems would result in out of date representations of less important parts of the virtual world as seen by the user. It would not affect the smooth motion by lowering the frame rate and would not let the image quality suffer. Such an overload condition can only occur during very rapid translation or when there are fast moving objects in the virtual environment. In such cases the ability of the human eye to perceive much detail is limited since fast moving objects tend to blur. Hence it is unlikely that such overload would even be noticed by the users unless the system was grossly under powered.

The address recalculation pipeline is a graphics controller which removes the latency to head rotations which plague most virtual reality implementations. When used in conjunction with image composition the address recalculation pipeline may also lead to significant savings in the rendering required to maintain the illusion of immersion within a virtual world. The techniques of image composition and prioritized rendering are most useful in the realm of virtual reality due to the independence of the rendered image and the user's head orientation when using the address recalculation pipeline. Prioritized rendering in particular enables reductions in rendering of orders of magnitude and also allows effective exploitation of parallel rendering hardware. The performance achievable by such a system is well beyond that attainable with conventional graphics computer systems, even those at the high end of the market.

The cost of a virtual reality system with an address recalculation pipeline is actually considerably lower than trying to achieve equivalent performance with conventional graphics architectures. However the hardware is not trivial and it is important to get the best performance from the investment. The address recalculation pipeline operates on the principle of having a display memory which surrounds the user rather than appearing as a rectangular screen in front of the user. Thus much more memory is required than for a conventional graphics system. As well there is a need for a number of large fast lookup tables which provide inputs at various stages of the pipeline. The access patterns for the display memory are rather random compared with the linear access patterns for conventional systems. The necessitates the use of large, fast, and relatively expensive static memories for the display memory. TO allow for image composition and prioritized rendering multiple display memories are required, also providing potential parallelism. All in all over 100 Mbytes of static memory chips have been used in a small prototype, which is able to demonstrate performance which eludes commercial systems costing over a million dollars.

Another consequence of the address recalculation pipeline is the desirability for hardware anti-aliasing. Since the hardware employs a sampling technique image aliases are introduced. The nature of the processing means that software cannot perform the required anti-aliasing hence the hardware pipeline includes anti-aliasing stages. The anti-aliasing imposes further demands on the display memory systems, in particular requiring a number of adjacent pixels to be processed concurrently.

Prioritized rendering can use the expected validity time of the object's displayed image to determine an appropriate update rate. If the validity time is very long that implies that the object's displayed image is changing very slowly. Often that means that the object's change of appearance is not the focus of the user's attention and hence slight delays in updating that object will not be noticed. Of course in such cases there is not much rendering of the object going on anyway, but it may be useful in the extreme case of an overloaded system to know that very slowly changing things can be deferred in favour of more quickly changing objects which are more likely to be the focus of the user's attention.

At the other extreme, objects with very short expected validity times indicate very rapid changes in the object itself or its relative position with respect to the user. While such objects may indeed be the focus of attention, if they are changing or apparently moving at great speeds then we can rely on the human visual system not be able to perceive accurately the details of fast moving objects. Factors such as motion blur come into play. We can thus take advantage of the lack of accurate perception of fast changing images to allow a reduction of rendering in this case. Certainly in this case the rendering load of the object will be significant since the object has a high update rate. Human factors here should allow us to reduce the update rate if there is a shortage of rendering capacity without a significant perceived degradation in performance. It is certainly expected that one could reduce the fastest rate of update to about 25–30 Hz, motion picture and television update rates, if necessary, without user perceptible degradation. Of course update rates greater than the update rate of the display device cannot have any observable effects and should be avoided.

When the system is pushed to its limits in terms of computational capacity available for rendering objects, there is the possibility of taking advantage of the user's focus of attention to allow selective degradation of image resolution on peripheral or background objects. This is possible due to having multiple display memories with individual renderers which may not only operate at different update rates but in extreme situations may be operated at different resolutions.

One may also consider the physical nature of the user's body. Consider the human factors of head rotation. While very fast rotation about the neck is possible, the degree of rotation is limited. It is not possible to rotate your head completely. To look behind you requires a body rotation which is much slower than a head rotation. Also sudden reversal of rotation is limited by human physical factors, as is vertical rotation. It thus follows that the update rates for parts of the virtual world which cannot be viewed immediately can be reduced, hence reducing the rendering load. In other words the priority of carrying out those updates can be lower.

It is also relevant that humans cannot tolerate excessive acceleration. Vehicles too cannot change direction very rapidly, so it is possible to use low priority updates for objects behind and to the side of the user, concentrating on what is ahead in the direction of travel. Too much perceived acceleration in a virtual environment can induce the disconcerting effect known as vection.

Apart from merely travelling within the virtual world acting as an observer, users will want to manipulate objects within the virtual world and have other intentional interactions. Such manipulations may be achieved through gesture or more directly through handling of objects via flow-like devices. When performing such manipulation the user is generally concentrating on the task at hand and not moving much within the virtual world. It is therefore possible for the priority of updates of the objects being manipulated and the objects representing the manipulator to be increased significantly above those of the rest of the visible scene, ensuring prompt visual feedback. Because in such cases it is known what the focus of the user's attention is, in the extreme case of renderer overload it is possible to concentrate on the important aspects of th displayed scene.

These human factors can certainly be used to improve the effective performance of virtual reality implementations using the techniques described hereinabove. While much experimentation is required to determine accurately the degree of benefit of these factors and especially to allow some more quantitative measures which can be employed directly in prioritized rendering, some of the general principles are fairly clear and others will not doubt become apparent.

With the improved performance available using the techniques described herein it is expected that future virtual reality applications will be able to be optimized for this technology. Furthermore the virtual worlds created for such systems will be characterized by complex scenes with highly realistic backgrounds and large numbers of independent objects. Conventional virtual reality systems suffer from unacceptable performance degradation with this kind of virtual world.

The technology also is directly applicable to telerobotic applications such as those found in controlling remote robotic manipulators in space or under sea. It is also ideal for Augmented Reality applications where virtual world images are superimposed on the real world.

The invention has been described herein by way of example only, and it is not intended that the description thereof be considered limiting to the invention which includes every novel feature and novel combination of features herein disclosed.

We claim:

1. A graphic display system comprising:
   a set of rendering engines;
   a plurality of data storage units, wherein each data storage unit in said set of data storage units is coupled to at least one rendering engine in said set of rendering engines; and
   a selection means for selecting a data storage unit in said plurality of data storage units, wherein said selected data storage unit is to be used for storing data representing an object to be displayed by said graphic display system and said selected data storage unit is selected based on a validity period of the object,
   wherein said selection means includes means for determining the validity period of the object, said means for determining the validity period of the object including:
   means for determining a size validity period of the object, and
   means for determining a translational validity period of the object according to the following equation:

$$\tau_{trans} = \frac{distance * sqrt(2 * (1 - \cos(\theta_1)))}{relative\_speed}$$

wherein the translational validity period is a time required for the object to change by a predetermined translational threshold, wherein said predetermined translational threshold is a first angle extending from a line, wherein the line passes through both a reference point and the object, wherein:
   $\tau_{trans}$ is the translational validity period,
   distance is a length of a portion of the line, wherein the portion extends from the reference point to a center of the object,
   relative speed is a speed of the object relative to the reference point, and
   $\theta_1$ is the predetermined translational threshold.

2. The graphic display system of claim 1, wherein each data storage unit in said plurality of data storage units has an update rate that is either equal to or a harmonic of a predefined update rate.

3. The graphic display system of claim 1, wherein said selected data storage unit has an update period that is less than or equal to the validity period.

4. The graphic display system of claim 1, wherein the predetermined translational threshold is equal to a pixel spacing.

5. The graphic display system of claim 1, wherein the size validity period is a time required for the object to change by a predetermined size threshold, wherein the predetermined size threshold is a second angle extending from the line.

6. The graphic display system of claim 5, wherein said means for determining the size validity period includes:
   means for calculating the size validity period, according to the following equation:

$$\tau_{size} = \frac{distance - radius/\sin(\theta_2 + A\sin(radius/distance))}{relative\_speed}$$

wherein:
   $\tau_{size}$ is the size validity period,
   radius is a length extending from the center of the object to a perimeter of a bounding sphere for the object, and
   $\theta_2$ is the predetermined size threshold.

7. The graphic display system of claim 6, wherein the predetermined size threshold is equal to a pixel spacing.

8. The graphic display system of claim 6, wherein the radius extends from the center of the object to an outer periphery of the object.

9. The graphic display system of claim 6, wherein the object has an animation validity period, and wherein said means for determining said validity period of the object includes:

means for selecting a smallest one of the translational validity period, the size validity period, and the animation validity period to be the validity period.

10. A method implemented by a graphical display system for rendering an object in at least one of a plurality of data storage units in said graphical display system, said method comprising the steps of:

(a) determining a validity period of the object;

(b) selecting a data storage unit in the plurality of data storage units based on the validity period; and (c) rendering the object in the data storage unit selected in said step (b), wherein said step (a) includes the steps of:
determining a size validity period of the object, and
calculating a translational validity period of the object according to the following equation:

$$\tau_{trans} = \frac{\text{distance} * \text{sqrt}(2 * (1 - \cos(\theta_1)))}{\text{relative\_speed}}$$

wherein the translational validity period is a time required for the object to change by a predetermined translational threshold, wherein the predetermined translational threshold is a first angle extending from a line, wherein the line passes through both a reference point and the object, wherein:

$\tau_{trans}$ is the translational validity period, distance is a length of a portion of the line, wherein the portion extends from the reference point to a center of the object, relative_speed is a speed of the object relative to the reference point, and $\theta_1$ is the predefined translational threshold.

11. The method of claim 10, wherein the data storage unit has an update period that is less than or equal to the validity period.

12. The method of claim 10 wherein the predetermined translational threshold is equal to a pixel spacing.

13. The method of claim 10, wherein the size validity period is a time required for the object to change by a predetermined size threshold, wherein the predetermined size threshold is a second angle extending from a line, wherein the line passes through a reference point and the object.

14. The method of claim 13, wherein said step of determining the size validity period of the object includes the step of:

calculating the size validity period, according to the following equation:

$$\tau_{size} = \frac{\text{distance} - \text{radius}/\sin(\theta_2 + A\sin(\text{radius}/\text{distance}))}{\text{relative\_speed}}$$

wherein:

$\tau_{size}$ is the size validity period, distance is a length of a portion of the line, wherein the portion extends from the reference point to a center of the object, relative_speed is a speed of the object relative to the reference point, radius is a length extending from the center of the object to a perimeter of a bounding sphere for the object, and $\theta_2$ is the predetermined size threshold.

15. The method of claim 14, wherein the predetermined size threshold is a pixel spacing.

16. The method of claim 14, wherein the radius extends from the center of the object to an outer periphery of the object.

17. The method of claim 10, wherein the object has an animation validity period and wherein said step (a) further includes the step of:

selecting a smallest one of the translational validity period, the size validity period, and the animation validity period to be the validity period of the object.

18. A method for determining a validity period for an object to be rendered by a graphic display system, wherein the object has an animation validity period, said method comprising the steps of:

calculating a translational validity period of the object according to the following equation:

$$\tau_{trans} = \frac{\text{distance} * \text{sqrt}(2 * (1 - \cos(\theta_1)))}{\text{relative\_speed}}$$

wherein the translational validity period is a time required for the object to change by a predetermined translational threshold and the predetermined translational threshold is a first angle extending from a line passing through both a reference point and the object, wherein:

$\tau_{trans}$ is the translational validity period, distance is a length of a portion of the line, wherein the portion extends from the reference point to a center of the object, relative_speed is a speed of the object relative to the reference point; and $\theta_1$ is the predetermined translational threshold;

determining a size validity period of the object according to the following equation:

$$\tau_{size} = \frac{\text{distance} - \text{radius}/\sin(\theta_2 + A\sin(\text{radius}/\text{distance}))}{\text{relative\_speed}}$$

wherein the size validity period is a time required for the object to change by a predetermined size threshold and the predetermined size threshold is a second angle extending from the line, wherein:

$\tau_{size}$ is the size validity period, radius is a length extending from the center of the object to a perimeter of a bounding sphere for the object, and $\theta_2$ is the predetermined size threshold; and selecting a smallest one of the translational validity period, the size validity period, and the animation validity period to be the validity period of the object.

19. The method of claim 18, wherein the radius extends from the center of the object to an outer periphery of the object.

20. The method of claim 18 wherein the predetermined translational threshold is equal to the predetermined size threshold.

21. The method of claim 20, wherein the predetermined size threshold is equal to a pixel spacing.

22. A method implemented by a graphical display system for rendering an object in at least one of a plurality of data storage units in said graphical display system, said method comprising the steps of:

(a) determining a validity period of the object;

(b) selecting a data storage unit in the plurality of data storage units based on the validity period; and (c) rendering the object in the data storage unit selected in said step (b), wherein said step (a) includes the steps of:
  determining a translational validity period of the object, and
  calculating a size validity period of the object according to the following equation:

$$\tau_{size} = \frac{distance - radius/\sin(\theta_2 + A\sin(radius/distance))}{relative\_speed}$$

wherein the size validity period is a time required for the object to change by a predetermined size threshold, wherein the predetermined size threshold is a second angle extending from a line, wherein the line passes through a reference point and the object, wherein:

$\tau_{size}$ is the size validity period,
  distance is a length of a portion of the line, wherein the portion extends from the reference point to a center of the object,
  relative_speed is a speed of the object relative to the reference point,
  radius is a length extending from the center of the object to a perimeter of a bounding sphere for the object, and
  $\theta_2$ is the predetermined size threshold.

23. The method of claim 22, wherein the translational validity period is a time required for the object to change by a predetermined translational threshold, wherein the predetermined translational threshold is a first angle extending from a line, wherein the line passes through both a reference point and the object.

24. Th method of claim 23, wherein said step of determining the translational validity period of the object includes the step of:

calculating the translational validity period, according to the following equation:

$$\tau_{trans} = \frac{distance * sqrt(2 * (1 - \cos(\theta_1)))}{relative\_speed}$$

wherein:

$\tau_{trans}$ is the translational validity period,
  distance is a length of a portion of the line, wherein the portion extends from the reference point to a center of the object,
  relative_speed is a speed of the object relative to the reference point, and
  $\theta_1$ is the predefined translational threshold.

25. The method of claim 22, wherein the radius extends from the center of the object to an outer periphery of the object.

26. The method of claim 22, wherein the object has an animation validity period and wherein said step (a) further includes the step of:

selecting a smallest one of the translational validity period, the size validity period, and the animation validity period to be the validity period of the object.

* * * * *